(12) United States Patent
Liu et al.

(10) Patent No.: US 9,598,506 B2
(45) Date of Patent: *Mar. 21, 2017

(54) CATALYST COMPOSITIONS AND THEIR USE FOR HYDROGENATION OF NITRILE RUBBER

(71) Applicant: ARLANXEO Deutschland GmbH, Dormagen (DE)

(72) Inventors: Qingchun Liu, Shandong (CN); Zhenli Wei, Shandong (CN)

(73) Assignee: ARLANXEO Deutschland GmbH, Dormagen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/348,912

(22) PCT Filed: Oct. 19, 2012

(86) PCT No.: PCT/EP2012/070812
§ 371 (c)(1),
(2) Date: Apr. 1, 2014

(87) PCT Pub. No.: WO2013/057286
PCT Pub. Date: Apr. 25, 2013

(65) Prior Publication Data
US 2015/0166686 A1 Jun. 18, 2015

Related U.S. Application Data

(63) Continuation of application No. PCT/CN2011/081092, filed on Oct. 21, 2011.

(51) Int. Cl.
C08C 19/02 (2006.01)
C08L 15/00 (2006.01)
B01J 31/22 (2006.01)
B01J 31/24 (2006.01)

(52) U.S. Cl.
CPC ........... *C08C 19/02* (2013.01); *B01J 31/2291* (2013.01); *B01J 31/2295* (2013.01); *B01J 31/24* (2013.01); *C08L 15/005* (2013.01); *B01J 2231/641* (2013.01); *B01J 2531/822* (2013.01)

(58) Field of Classification Search
None
See application file for complete search history.

(56) References Cited

U.S. PATENT DOCUMENTS

| | | |
|---|---|---|
| 3,700,637 A | 10/1972 | Finch, Jr. |
| 4,503,196 A | 3/1985 | Rempel et al. |
| 4,581,417 A | 4/1986 | Buding et al. |
| 4,631,315 A | 12/1986 | Buding et al. |
| 4,746,707 A | 5/1988 | Fiedler et al. |
| 4,795,788 A | 1/1989 | Himmler et al. |
| 4,816,525 A | 3/1989 | Rempel et al. |
| 4,978,771 A | 12/1990 | Fiedler et al. |
| 5,258,467 A | 11/1993 | Rempel et al. |
| 5,969,170 A | 10/1999 | Grubbs et al. |
| 6,268,501 B1 | 7/2001 | Kiel |
| 6,838,489 B2 | 1/2005 | Bell et al. |
| 6,908,970 B2 | 6/2005 | Tsunogae et al. |
| 7,205,424 B2 | 4/2007 | Nolan |
| 7,381,781 B2 | 6/2008 | Ong et al. |
| 7,585,920 B2 | 9/2009 | Guerin |
| 7,598,330 B2 | 10/2009 | Grubbs et al. |
| 7,846,995 B2 | 12/2010 | Ong et al. |
| 7,951,875 B2 | 5/2011 | Guerin et al. |
| 8,062,573 B2 | 11/2011 | Kwon |
| 8,288,576 B2 | 10/2012 | Zhan |
| 8,604,141 B2 | 12/2013 | Grubbs et al. |
| 2007/0049700 A1 | 3/2007 | Obrecht et al. |
| 2007/0208206 A1 | 9/2007 | Obrecht et al. |
| 2008/0064882 A1 | 3/2008 | Huber-Dirr et al. |
| 2008/0076881 A1 | 3/2008 | Obrecht et al. |
| 2008/0214741 A1* | 9/2008 | Guerin ............... 525/329.1 |
| 2009/0054597 A1 | 2/2009 | Ong et al. |
| 2009/0069516 A1 | 3/2009 | Obrecht et al. |
| 2009/0076226 A1* | 3/2009 | Meca et al. ............ 525/340 |
| 2009/0227444 A1 | 9/2009 | Ong et al. |
| 2010/0087600 A1 | 4/2010 | Muller et al. |
| 2010/0093931 A1* | 4/2010 | Rempel et al. ............ 525/52 |
| 2010/0093944 A1* | 4/2010 | Muller et al. ........... 525/328.3 |
| 2012/0016093 A1 | 1/2012 | Zhan |
| 2012/0270996 A1 | 10/2012 | Pan et al. |
| 2012/0329954 A1 | 12/2012 | Ong et al. |
| 2013/0005916 A1 | 1/2013 | Ong et al. |

FOREIGN PATENT DOCUMENTS

| | | |
|---|---|---|
| CN | 101885788 A | 11/2010 |
| EP | 0471250 A1 | 2/1992 |
| EP | 2145681 A1 | 1/2010 |
| GB | 1558491 | 1/1980 |
| WO | 2011079439 A1 | 7/2011 |

OTHER PUBLICATIONS

Drouin, Inorg. Chem., 2000, 39, 5412-5414.*
Romero, P. E., "Rapidly Initiating Ruthenium Olefin-Metathesis Catalysts", Agnew. Chem. Int. Ed., 2004, 43 pp. 6161-6165.
Grela, K., "A High Efficient Ruthenium Catalyst for Metathesis Reactions",Angew. Chem. Int. Ed., 2002, 41, No. 21, pp. 4038-4040.
Sanford, M. S., "A Versatile Precursor for the Synthesis of New Ruthenium Olefin Metathesis Catalysts",American Chemical Society, Organometallics, 2001, 20, pp. 5314-5318.
International Search Report from co-pending Application PCT/EP2012/070812 dated Feb. 3, 2013, 3 pages.
International Search Report from International Application No. PCT/CN2011/081092, Jun. 28, 2012, 3 pages.

* cited by examiner

*Primary Examiner* — Robert C Boyle

(57) ABSTRACT

This invention relates to novel catalyst compositions based on Ruthenium- or Osmium-based complex catalysts and to a process for selectively hydrogenating nitrile rubbers in the presence of such catalyst compositions.

17 Claims, No Drawings

CATALYST COMPOSITIONS AND THEIR USE FOR HYDROGENATION OF NITRILE RUBBER

FIELD OF THE INVENTION

This invention relates to novel catalyst compositions based on Ruthenium- or Osmium-based complex catalysts and to a process for selectively hydrogenating nitrile rubbers in the presence of such catalyst compositions.

BACKGROUND OF THE INVENTION

The term "acrylonitrile-butadiene rubber" or "nitrile rubber", also named as "NBR" for short, shall be interpreted broadly and refers to rubbers which are copolymers or terpolymers of at least one $\alpha,\beta$-unsaturated nitrile, at least one conjugated diene and, if desired, one or more further copolymerizable monomers.

Hydrogenated NBR, also referred to as "HNBR" for short, is produced commercially by hydrogenation of NBR. Accordingly, the selective hydrogenation of the carbon-carbon double bonds in the diene-based polymer must be conducted without affecting the nitrile groups and other functional groups (such as carboxyl groups when other copolymerizable monomers were introduced into the polymer chains) in the polymer chains.

HNBR is a specialty rubber which has very good heat resistance, an excellent resistance to ozone and chemicals and also an excellent oil resistance. The abovementioned physical and chemical properties of HNBR are associated with very good mechanical properties, in particular a high abrasion resistance. For this reason, HNBR has found wide use in a variety of applications. HNBR is used, for example, for seals, hoses, belts and damping elements in the automobile sector, also for stators, oil well seals and valve seals in the field of oil exploration and also for numerous parts in the aircraft industry, the electronics industry, mechanical engineering and shipbuilding. A hydrogenation conversion higher than 95%, or a residual double bond (RDB) content <5%, without cross-linking during the hydrogenation reaction and a gel level of less than about 2.5% in the resultant HNBR is a threshold that ensures high-performance applications of HNBR in these areas and guarantees excellent processability of the final product.

The degree of hydrogenation of the copolymerized diene units in HNBR may vary in the range from 50 to 100%, however, the desired hydrogenation degree is from about 80 to about 100%, preferably from about 90 to about 99.9%. Commercial grades of HNBR typically have a remaining level of unsaturation below 18% and a content of acrylonitrile of roughly up to about 50%.

It is possible to carry out the hydrogenation of NBR either with homogeneous or with heterogeneous hydrogenation catalysts. The catalysts used are usually based on rhodium, ruthenium or palladium, but it is also possible to use platinum, iridium, rhenium, osmium, cobalt or copper either as metal or preferably in the form of metal compounds (see e.g. U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196). Suitable catalysts and solvents for a hydrogenation in the homogeneous phase are known from DE-A-25 39 132 and EP-A-0 471 250.

Also for commercial purposes the production of HNBR by hydrogenation of NBR is performed in organic solvents by using either a heterogeneous or a homogeneous transition metal catalyst often based on rhodium or palladium. Such processes suffer from drawbacks such as high prices for the catalyst metals and the cost involved in catalyst metal removal/recycle. This has led to research and development of alternative catalysts based on cheaper noble metals, such as osmium and ruthenium.

Alternative NBR hydrogenation processes can be performed using Os-based catalysts. One catalyst excellently suited for NBR hydrogenation is $OsHCl(CO)(O_2)(PCy_3)_2$ as described in lad. Eng. Chem. Res., 1998, 37(11), 4253-4261). The rates of hydrogenation using this catalyst are superior to those produced by Wilkinson's catalyst ($RhCl(PPh_3)_3$) over the entire range of reaction conditions studied.

Ru-based complexes are also good catalysts for polymer solution hydrogenation, and the price for Ru metal is even cheaper. $Ru$—$PPh_3$ complexes and $RuHCl(CO)L_2$ (L is a bulky phosphine) catalyst systems lead to quantitative hydrogenation of NBR as disclosed in Journal of Molecular Catalysis A: Chemical, 1997, 126(2-3), 115-131. During such hydrogenation it is not necessary to add a free phosphine ligand to maintain the catalyst activity. However, they are prone to gel formation and may cause a certain degree of cross-linking during hydrogenation.

However, these above mentioned Os or Ru catalysts are active catalysts for hydrogenation only, not for metathesis reactions. Therefore, these types of Os or Ru catalysts cannot be used for NBR metathesis/degradation to produce NBR with reduced molecular weight.

Another problem of the HNBR production is that HNBR with a low Mooney viscosity is difficult to manufacture by the direct hydrogenation of commercially available NBR. The relatively high Mooney viscosity places restrictions on the processability of HNBR. Many applications would ideally use HNBR grades with a lower molecular weight and a lower Mooney viscosity. This would give a decisive improvement in processability.

For a long time, it has not been possible to produce HNBR on a large scale having a low molar mass corresponding to a Mooney viscosity (ML1+4 at 100° C.) in the range below 55 or with a weight average molecular weight of about Mw<200000 g/mol by means of the established direct NBR hydrogenation processes mainly for two reasons: Firstly a sharp increase in the Mooney viscosity occurs during hydrogenation of NBR which means that a HNBR polymer with substantially increased Mooney viscosity is obtained. The Mooney Increase Ratio (MIR) is generally around 2 or even above, depending upon the NBR grade, hydrogenation level and nature of the NBR feedstock. Thus, the Mooney viscosity range of marketed HNBR is limited by the lower limit of the Mooney viscosity of the NBR starting material. Secondly, the molar mass of the NBR feedstock to be used for the hydrogenation cannot be reduced at will since otherwise work-up in the NBR industrial plants available is no longer possible because the rubber becomes too sticky. The lowest Mooney viscosity of an NBR feedstock which can be worked up without difficulties in an established industrial plant is in a range of about 30 Mooney units (ML1+4 at 100° C.). The Mooney viscosity of the hydrogenated nitrile rubber obtained using such an NBR feedstock is in the order of 55 Mooney units (ML1+4 at 100° C.). The Mooney viscosity is determined in accordance with ASTM standard D 1646.

In the more recent prior art, this problem is solved by reducing the molecular weight of the nitrile rubber before hydrogenation by degradation to a Mooney viscosity (ML1+4 at 100° C.) of less than 30 Mooney units or a weight average molecular weight of Mw<200000 g/mol. The reduction in the molecular weight is achieved by metathesis of the NBR in the presence of metathesis catalysts. WO-A-02/100905 and WO-A-02/100941 describe for example a process which comprises degradation of nitrile rubber starting polymers by olefin metathesis and subsequent hydrogenation. A nitrile rubber is reacted in a first step in the presence of a coolefine and a specific catalyst based on osmium, ruthenium, molybdenum or tungsten complexes and hydrogenated in a second step. The hydrogenated nitrile rubbers obtained may have a weight average molecular weight (Mw) in the range from 30 000 to 250 000, a Mooney viscosity (ML 1+4 at 100° C.) in the range from 3 to 50 and a polydispersity index PDI of less than 2.5. The metathesis reaction is advantageously carried out in the same solvent as the subsequent hydrogenation so that the degraded nitrite rubber does not have to be necessarily isolated from the solvent after the degradation reaction is complete. Well-known for metathesis of nitrile rubber are a number of Ru-based metathesis catalysts like e.g. Grubbs I (benzylidene bis(tricyelohexylphosphine)dichloro ruthenium), Grubbs II (benzylidene [1,3-bis(2,4,6-trimethylphenyl)-2-imidazolidinyliden]tricyclohexylphosphin dichloro ruthenium), Grubbs III (benzylidene[1,3-bis(2,4,6-trimethylphenyl)-2-imidazolidin-ylidene]dichloro-bis(3-bromopyridine) ruthenium), Hoveyda-Grubbs II ([1,3-bis-(2,4,6-trimethylphenyl)-2-imidazolidinyliden]dichloro(o-isopropoxyphenylmethylen) ruthenium) (see e.g. US-A-2008/0064882) and a number of fluorenyliden-based complex catalysts (see e.g. US-A-2009/0076226)

EP-A-1 905 777 discloses ruthenium complex catalysts having the general structure

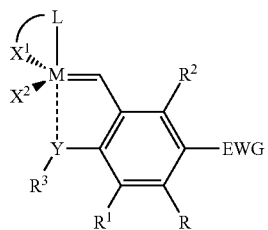

wherein
M is ruthenium,
$X^1$ and $X^2$ are each chloro or RCOO with R in such RCOO being $C_1$-$C_{20}$ alkyl or a derivative thereof,
L is an electron donating complex ligand, which could be linked or not linked with $X^1$ to form a cyclic structure
Y is oxygen, sulfur, nitrogen or phosphorus;
R is H, halogen atom, nitro, cyano, $C_1$-$C_{20}$ alkyl, $C_1$-$C_{20}$ alkoxy, $C_1$-$C_{20}$ alkylthio, $C_1$-$C_{20}$ silanyl, $C_1$-$C_{20}$ silanyloxy, $C_6$-$C_{20}$ aryl, $C_6$-$C_{20}$ aryloxy, $C_2$-$C_{20}$ heterocyclic, $C_2$-$C_{20}$ heterocyclic aryl, sulfinyl, sulfonyl, formyl, $C_1$-$C_{20}$ carbonyl, $C_1$-$C_{20}$ ester, $C_1$-$C_{20}$ amido, $C_1$-$C_{20}$ uramido or derivatives or $C_1$-$C_{20}$ sulfonamido group;
$R^1$ and $R^2$ are each H, bromo (Br), iodo $C_1$-$C_{20}$ alkyl or derivatives, $C_1$-$C_{20}$ alkoxy, $C_1$-$C_{20}$ alkylthio, $C_1$-$C_{20}$ silanyloxy, $C_6$-$C_{20}$ aryloxy, $C_6$-$C_{20}$ aryl, $C_2$-$C_{20}$ heterocyclic, $C_2$-$C_{20}$ heterocyclic aryl, $C_1$-$C_{20}$ ester, $C_1$-$C_{20}$ amido, $C_1$-$C_{20}$ uramido or derivatives or $C_1$-$C_{20}$ sulfonamido group;
$R^3$ is H, $C_1$-$C_{20}$ alkyl or derivatives, $C_1$-$C_{20}$ alkoxy, $C_1$-$C_{20}$ alkylthio, $C_1$-$C_{20}$ silanyl, $C_1$-$C_{20}$ silanyloxy, $C_6$-$C_{20}$ aryl, $C_6$-$C_{20}$ aryloxy. $C_2$-$C_{20}$ heterocyclic, $C_2$-$C_{20}$ heterocyclic aryl, sulfinyl, sulfonyl, $C_1$-$C_{20}$ carbonyl, $C_1$-$C_{20}$ ester, $C_1$-$C_{20}$ amido, $C_1$-$C_{20}$ uramido or derivatives or $C_1$-$C_{20}$ sulfonamido group; and
EWG is $C_1$-$C_{20}$ aminosulfonyl ($SO_2NR_2$), formyl, $C_1$-$C_{20}$ carbonyl, $C_1$-$C_{20}$ ester, $C_1$-$C_{20}$ aminocarbonyl ($CONR_2$), amido, chloro, fluoro, uramido or derivatives or $C_1$-$C_{20}$ sulfonamido group.

EP-A-1 905 777 further states that these catalysts can be used in olefin metathesis reactions including ring-closing olefin metathesis reactions, intermolecular olefin metathesis reactions, and olefin metathesis polymerization reactions. The examples show the preparation of low molecular weight substances by intramolecular ring closing metathesis in the presence of certain of the generally disclosed catalysts. EP-A-1 905 777 does neither provide any disclosure that these catalysts can be used to degrade the molecular weight of polymers, in particular nitrile rubbers nor that they show any hydrogenation activity.

Further on processes for simultaneous metathesis and hydrogenation are known from prior art. In WO-A-2005/080456 the preparation of hydrogenated nitrile rubber polymers having low molecular weights and narrower molecular weight distributions than those known in the art is carried out by simultaneously subjecting the nitrile rubber to a metathesis reaction and a hydrogenation reaction. The reaction takes place in the presence of a Ruthenium- or Osmium-based pentacoordinated complex catalyst, in particular 1,3-bis(2,4,6-trimethylphenyl)-2-imidazolidinylidene) (tricyclohexylphosphine) ruthenium (phenylmethy-lene) dichloride (also called Grubbs $2^{nd}$ generation catalyst). However, WO-A-2005/080456 does not provide any disclosure or teaching how to influence the two simultaneously occurring reactions, i.e. metathesis and hydrogenation or how to control the activity of the respective catalysts regarding metathesis and hydrogenation.

WO-A-2011/023788 also discloses a process for subjecting a nitrile rubber in the presence of hydrogen to a combined and simultaneous metathesis and hydrogenation reaction in the presence of specifically defined hexacoordinated Ruthenium-oder Osmium based catalysts in order to prepare hydrogenated nitrile rubbers having lower molecular weights and narrower molecular weight distributions than those known in the art. Such process is performed by using at least one catalyst of general formula (I) to (III)

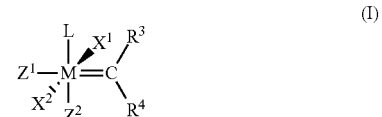 (I)

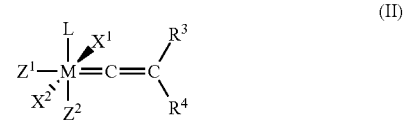 (II)

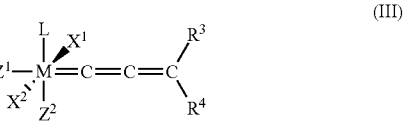 (III)

where
M is ruthenium or osmium,
$X^1$ and $X^2$ are identical or different ligands, preferably anionic ligands, $Z^1$ and $Z^2$ are identical or different and neutral electron donor ligands, $R^3$ and $R^4$ are each independently H or a substituent selected from the group consisting of alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl and alkylsulphinyl radical, each of which may optionally be substituted by one or more alkyl, halogen, alkoxy, aryl or heteroaryl moities, and L is a ligand.

WO-A-2011/029732 also discloses an alternative process for subjecting a nitrile rubber in the presence of hydrogen to a combined and simultaneous metathesis and hydrogenation reaction in the presence of specifically defined pentacoordinated Ruthenium- or Osmium based catalysts in order to prepare hydrogenated nitrile rubbers having low molecular weights and a narrow molecular weight distribution. Such process is performed in the presence of at least one compound of the general formula (I),

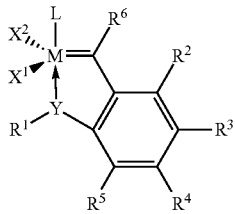

(I)

where

M is ruthenium or osmium,

Y is oxygen (O), sulphur (S), an N—$R^1$ radical or a P—$R^1$ radical, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl, $CR^{13}C(O)R^{14}$ or alkylsulphinyl moiety, each of which may optionally be substituted by one or more alkyl, halogen, alkoxy, aryl or heteroaryl moiety, $R^{13}$ is hydrogen or alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl moiety, each of which may optionally be substituted by one or more alkyl, halogen, alkoxy, aryl or heteroaryl moiety;

$R^{14}$ is alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl moiety, each of which may optionally be substituted by one or more alkyl, halogen, alkoxy, aryl or heteroaryl moiety;

$R^2$, $R^3$, $R^4$ and $R^5$ are identical or different and are each H, organic or inorganic radicals, $R^6$ is H or an alkyl, alkenyl, alkynyl or aryl radical and L is a ligand.

However, neither WO-A-2011/023788 nor WO-A-2011/029732 provide any disclosure or teaching how to influence the two simultaneously occurring reactions, i.e. metathesis and hydrogenation or how to control the two-fold activity of the respective catalysts for metathesis and hydrogenation.

WO-A-2011/079799 discloses a broad variety of catalysts the general structure of which is shown hereinafter

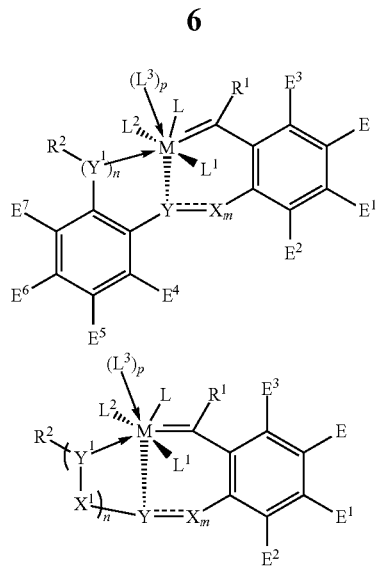

It is stated that such catalysts can be used to provide modified nitrile butadiene rubber (NBR) or styrene-butadiene rubber (SBR) by depolymerisation. It is further stated that the catalysts can be used in a method of making a depolymerized HNBR or styrene-butadiene rubber by adding one or more of those catalysts first to carry out depolymerisation of NBR, followed by adding hydrogen into the reactor under high pressure for hydrogenation. In another embodiment it is disclosed to prepare HNBR by adding hydrogen under high pressure first, then followed by adding one or more of the above catalysts. However, WO-A-2011/079799 does not provide any disclosure or teaching how to influence the different catalytic activities of the catalysts for depolymerisation (metathesis) and hydrogenation. It is accepted that while hydrogenation takes place simultaneously metathesis leads to a degradation of the molecular weight in uncontrolled manner.

A number of references describe the use of metathesis catalysts in two step reactions starting with a ring-opening metathesis polymerisation (ROMP) first which is followed by a hydrogenation reaction (so called "tandem polymerization/hydrogenation reactions").

According to Organometallics, 2001, 20(26), 5495-5497 the metathesis catalyst Grubbs I can be used for ROMP of cyclooctene or a norbornene derivative first, then followed by a hydrogenation of the polymers. It is reported that the addition of a base like $NEt_3$ increases the catalytic activity in the hydrogenation reaction.

J. Am. Chem. Soc 2007, 129, 4168-9 also relates to tandem ROMP-hydrogenation reactions starting from functionalized norbornenes and compares the use of three Ruthenium-based catalysts, i.e. Grubbs I, Grubbs II and Grubbs III catalysts in such tandem reactions. It is described that the Ruthenium-based catalyst on the end of the polymer backbone is liberated and transformed into a hydrogenation-active species through reaction with $H_2$, base ($NEt_3$), and methanol.

EP-A-1 197 509 discloses a process for preparing a hydrogenated polymer by polymerizing a cycloolefine in the presence of an organo ruthenium or osmium compound and subsequently subjecting the unsaturated polymer obtained during polymerization to a hydrogenation under addition of a hydrogenation catalyst. EP-A-1 197 509 does not describe any cross-metathesis and does not relate to any degradation of the polymer via metathesis Inorg. Chem 2000, 39, 5412-14 also explores tandem ROMP polymerization/hydrogenation reactions. The focus lies on the mechanism of the hydrogenolysis of the ruthenium-based metathesis catalyst Grubbs I. It is shown that such catalyst is transformed into dihydride, dihydrogen and hydride species under conditions relevant to hydrogenation chemistry. However, there is no disclosure at all about polymer degradation via metathesis or hydrogenation of unsaturated polymers.

In further references the quenching of metathesis reactions with vinyl compounds is described: Numerous patent applications like US-A-2007/0049700, US-A-2008/0064882, US-A-2007/0208206, US-A-2008/0076881, US-A-2009/054597, US-A-2009/0069516, US-A-2009/0076227, US-A-2009/0076226, US-A-2010/0087600, US-A-2010/0093944, and two not yet published patent applications with the serial numbers EP 11153437.6 and PCT/EP2011/063570 referring to the molecular weight degradation of nitrile rubbers by a methathesis reaction contain experiments in which the reaction mixture is treated with vinylethylether after the metathesis reaction in order to destroy the metathesis catalyst. The molar ratio of vinylethylether to the metathesis catalysts used is very high in order to efficiently stop the metathesis reaction by deactivation of the catalyst. In the aforementioned applications such molar ratio lies in a range of from 567:1 to more than 17.000:1. None of those patent applications provides any disclosure or hint that by choosing lower ratios of the deactivating reagent to the metathesis catalyst a catalyst composition is obtained which is excellently suited for a selective hydrogenation, i.e. without continuing to catalyse the metathetic degradation.

In J. Am. Chem. Soc. 2001, 123, 6543-54 the mechanism of ruthenium based catalysts for olefin metathesis is disclosed. Further on it is described that the reaction of ruthenium carbenes with ethylvinylether can be utilized as a method for quenching ring opening metathesis polymerization. As shown in the following scheme a so-called Fischer-carbene complex is reported to be built.

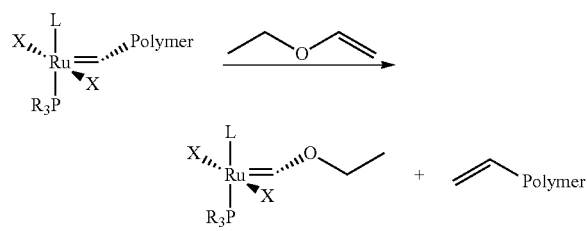

In Tetrahedron Letters 50 (2009), 6103-5 it is disclosed that di (ethylene glycol) vinyl ether and amine derivatives thereof can also be used as deactivating reagents for olefin metathesis catalysts. It is experimentally shown that the use of 4 equivalents of di (ethylene glycol) vinyl ether based on the metathesis catalyst are sufficient to efficiently deactivate the metathesis catalyst. Even 2 equivalents are reported to be sufficient. However, this reference does not deal with hydrogenation processes subsequently to olefin metathesis at all.

In Macromol. Symp. 2010, 297, 25-32 it is shown that polyisobutylene ("PIB") terminally functionalized with a vinyl ether group may serve to sequester a complex catalyst by conversion of a reactive ruthenium alkylidene complex into a phase-immobilized Fischer carbene complex. Additionally kinetic studies are presented on the reaction of 2 equivalents PIB vinyl ether and 6 as well as 15 equivalents of ethyl vinyl ether with Grubbs II catalyst.

It can be seen from the above that:
(1) up to now, hydrogenation catalysts which are very active for the selective hydrogenation of nitrile rubbers are known and Rh- and Pd-based catalysts are already used in industrial hydrogenation processes; however, cheaper Ru-based hydrogenation catalysts are still facing the gel formation problem when used for NBR hydrogenation. Most importantly, only HNBR with high molecular weight can be produced by using these catalysts which can only catalyse the NBR hydrogenation. The molecular weight of the final HNBR is determined by the molecular weight of the raw NBR, not by the hydrogenation catalysts;
(2) the degradation of nitrile rubber by metathesis is known using ruthenium- or osmium-based metathesis catalysts followed by a hydrogenation of the degraded nitrile rubber to afford hydrogenated nitrile rubber; if the same catalyst is used for metathesis and for hydrogenation, such catalysts are highly active for NBR metathesis while not so active for NBR hydrogenation; and
(3) catalysts which possess catalytic activity for both, i.e. metathesis and hydrogenation, cannot be used in a controlled manner.

Therefore, in current commercial production processes, a separate hydrogenation catalyst is added into the reaction system for the NBR hydrogenation after the NBR metathesis step. In this way, HNBR with controlled molecular weight can be produced, but two catalysts (one for metathesis and one for hydrogenation) are required to achieve high reaction efficiency.

However, hitherto there is not a single literature reporting the preparation of hydrogenated nitrile rubber with controlled molecular weight and therefore controllable Mooney viscosity only using a ruthenium- or osmium-based catalyst which is otherwise known for its metathetic activity. Also, up to now, there is no hydrogenation catalyst which can be used at a very low concentration for NBR hydrogenation to high conversion. So far a catalyst removal or recycle step is required after the hydrogenation.

Accordingly it was the object of the present invention to provide an improved process for selectively hydrogenating nitrile rubber at low catalyst concentrations and short hydrogenation times.

SUMMARY OF THE INVENTION

The present invention relates to a process of hydrogenating a nitrile rubber comprising
a) contacting a complex catalyst based on ruthenium or osmium as central metal and bearing at least one ligand which is bound to the ruthenium or osmium central metal in a carbene-like fashion with hydrogen in the absence of a nitrile rubber at a temperature in the range of from 75° C. to 200° C. to form a catalyst composition and thereafter
b) hydrogenating the nitrile rubber in the presence of the catalyst composition formed in step a).

The present invention further relates to a novel catalyst composition which is obtainable by contacting a complex catalyst based on ruthenium or osmium as central metal and bearing at least one ligand which is bound to the ruthenium or osmium central metal in a carbene-like fashion with hydrogen in the absence of nitrile rubber at a temperature in the range of from 75° C. to 200° C.

While the above described prior art like e.g. WO-A-2011/023788 and WO-A-2011/029732 always disclosed simultaneous and competing metathesis when a catalyst with metathesis activity was used for hydrogenation of nitrile rubbers, the novel process advantageously allows for the first time to perform a hydrogenation of nitrile rubber without a simultaneous metathetic degradation of the nitrile rubber, if a catalyst composition is used which has been obtained by treating a metathesis catalyst with hydrogen first. Hence, the present process allows a hydrogenation of nitrile rubbers in a controlled manner, i.e. under formation of hydrogenated nitrile rubber with a tailormade molecular weight in a commercially attractive fashion. It is possible to keep the molecular weight of the nitrile rubber constant during hydrogenation. In the alternative it is also possible to adjust and regulate the molecular weight of the nitrile rubber in a desired manner by controlling the pretreatment of the metathesis catalyst with hydrogen when preparing the novel catalyst composition. Additionally the hydrogenation process of the present invention allows to use the ruthenium- or osmium-based catalyst in a very low concentration so that there is no need to remove or recycle the catalyst after the hydrogenation.

The catalyst composition prepared and used according to the present invention is characterized by its high hydrogenation activity. High hydrogenation degrees may be achieved in short reaction times. In particular the hydrogenation activity of the novel catalyst composition is higher than the hydrogenation activity of the corresponding ruthenium- or osmium-based catalyst only used as such for NBR hydrogenation.

DETAILED DESCRIPTION OF THE INVENTION

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of moieties, parameters or explanations given above or below in general terms or in preferred ranges can be combined with one another in any way, i.e. including combinations of the respective ranges and preferred ranges.

Catalysts:

The catalysts to be used in the process of the invention are complex catalysts based either on ruthenium or osmium. Further on, these complex catalysts have the common structural feature that they possess at least one ligand which is bound to ruthenium or osmium in a carbene-like fashion. In a preferred embodiment, the complex catalyst has two carbene ligands, i.e. two ligands which are bound in a carbene-like fashion to the central metal of the complex.

The novel catalyst composition of the present invention is obtainable using for example a catalyst of the general formula (A),

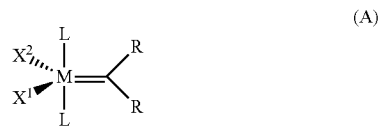

(A)

where
M is osmium or ruthenium,
$X^1$ and $X^2$ are identical or different and are two ligands, preferably anionic ligands,
L are identical or different ligands, preferably uncharged electron donors,
R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where these groups may in each case optionally be substituted by one or more alkyl, halogen, alkoxy, aryl or heteroaryl moieties or, as an alternative, the two groups R together with the common carbon atom to which they are bound are bridged to form a cyclic structure which can be aliphatic or aromatic in nature, may be substituted and may contain one or more heteroatoms.

Various representatives of the catalysts of the formula (A) are known in principle, e.g. from WO-A-96/04289 and WO-A-97/06185.

In preferred catalysts of the general formula (A), one group R is hydrogen and the other group R is $C_1$-$C_{20}$-alkyl, $C_3$-$C_{10}$-cycloalkyl, $C_2$-$C_{20}$-alkenyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these moiety may in each case be substituted by one or more alkyl, halogen, alkoxy, aryl or heteroaryl groups.

Definition of $X^1$ and $X^2$

In the catalysts of the general formula (A), $X^1$ and $X^2$ are identical or different and are two ligands, preferably anionic ligands.

$X^1$ and $X^2$ can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

$X^1$ and $X^2$ can also be substituted by one or more further groups, for example by halogen, preferably fluorine, $C_1$-$C_{10}$-alkyl, $C_1$-$C_{10}$-alkoxy or $C_6$-$C_{24}$-aryl, where these groups, too, may once again be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate ($CH_3$—$SO_3$) or $CF_3SO_3$ (trifluoromethanesulphonate).

Definition of L

In the general formula (A), the symbols L represent identical or different ligands and are preferably uncharged electron donating ligand.

The two ligands L can, for example, be, independently of one another, a phosphine, sulphonated phosphine, phosphate, phosphinite, phosphonite, arsine, stibine, ether, amine, amide, sulfonate, sulfoxide, carboxyl, nitrosyl, pyridine, thioether, imidazoline or imidazolidine (the latter two also being jointly referred to as "Im" ligand(s))

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulphonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands as are mentioned by, for example, Grubbs in WO-A-03/011455. Examples are: pyridine, picolines (including α-, β- and γ-picoline), lutidines (including 2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

In a preferred embodiment catalysts of general formula (A) are used in which one or both of ligands L represent an imidazoline or imidazolidine ligand (also jointly referred to as "Im"—ligand in this application unless indicated otherwise), having a structure of general formulae (IIa) or (IIb), wherein the meaning of L can be identical or different in case both ligands L have a structure according to (II) or (IIb),

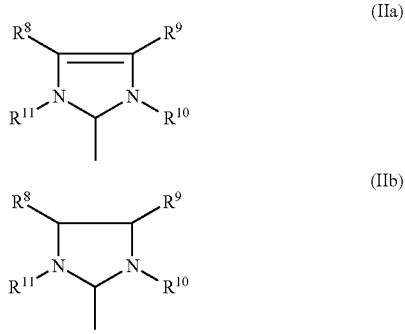

where $R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano, wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, where these abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazoline and imidazolidine ligand depicted in the general formulae (IIa) and (IIb) in the present patent application are equivalent to the structures (IIa') and (IIb') which are frequently also found in the literature for this imidazoline and imidazolidine ligand, respectively, and emphasize the carbene character of the imidazoline and imidazolidine. This applies analogously to the associated preferred structures (IIIa)-(IIIu) depicted below.

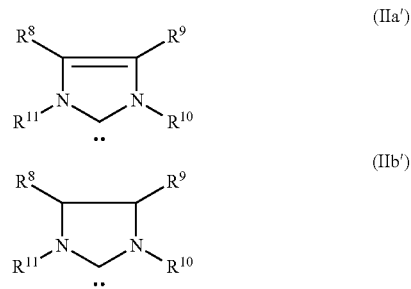

In a preferred embodiment of the catalysts of the general formula (A), $R^8$ and $R^9$ are each identical or different and represent hydrogen, $C_6$-$C_{24}$-aryl, straight-chain or branched $C_1$-$C_{10}$-alkyl, or form a cycloalkyl or aryl structure together with the carbon atoms to which they are bound.

More preferably $R^8$ and $R^9$ are identical and are selected from the group consisting of hydrogen, methyl, propyl, butyl and phenyl.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

$R^{10}$ and $R^{11}$ are identical or different and preferably represent straight-chain or branched $C_1$-$C_{10}$-alkyl, $C_3$-$C_{10}$-cycloalkyl, $C_6$-$C_{24}$-aryl, particularly preferably phenyl, $C_1$-$C_{10}$-alkylsulfonate, $C_6$-$C_{10}$-arylsulfonate.

More preferably $R^{10}$ and $R^{11}$ are identical and are selected from the group consisting of i-propyl, neopentyl, adamantyl, phenyl, 2,6-diisopropylphenyl, 2,6-dimethylphenyl, or 2,4,6-trimethylphenyl.

These preferred meanings of $R^{10}$ and $R^{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

Particularly preferred are catalysts of general formula (A) in which one or both of ligands L represent imidazoline and imidazolidine ligands having the structures (IIIa) to (IIIu), where "Ph" means in each case phenyl, "Bu" means butyl, "Mes" represents in each case 2,4,6-trimethylphenyl, "Dipp" means in all cases 2,6-diisopropylphenyl and "Dimp" means 2,6-dimethylphenyl, and wherein the meaning of L can be identical or different in case both ligands L in general formula (A) have a structure according to (IIIa) to (IIIu),

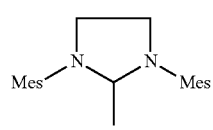
(IIIa)

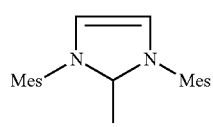
(IIIb)

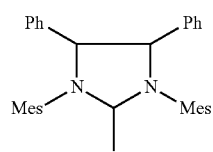
(IIIc)

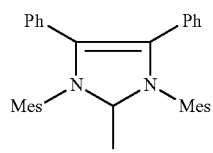
(IIId)

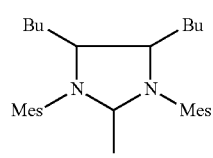
(IIIe)

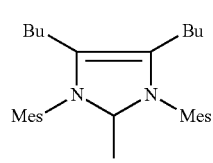
(IIIf)

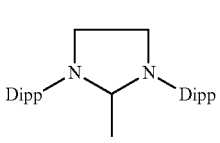
(IIIg)

-continued

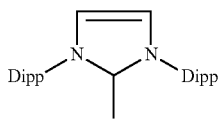
(IIIh)

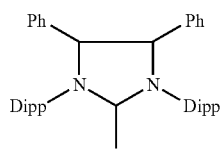
(IIIj)

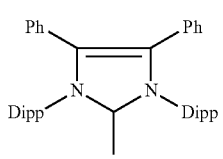
(IIIk)

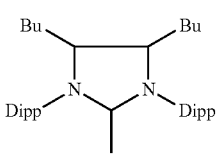
(IIIm)

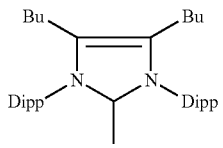
(IIIn)

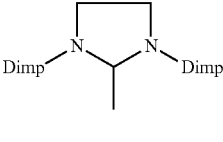
(IIIp)

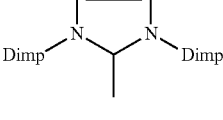
(IIIq)

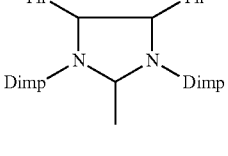
(IIIr)

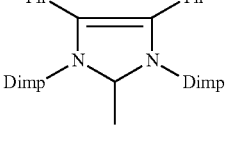
(IIIs)

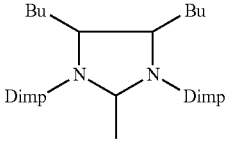
(IIIt)

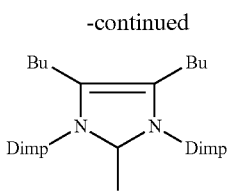
(IIIu)

In a further preferred embodiment of catalyst (A) one or both of the ligands L may have the meaning of general formulae (IIc) or (IId), wherein the meaning of L can be identical or different in case both ligands L have a structure according to (IIc) or (IId),

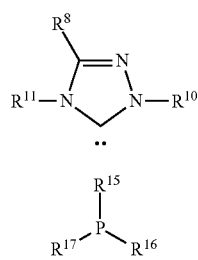
(IIc)

(IId)

wherein
R$^8$, R$^9$ and R$^{10}$ may have all general, preferred, more preferred and most preferred meanings as defined above in relation to general formulae (IIa) and (IIb), and
R$^{15}$, R$^{16}$ and R$^{17}$ are identical or different and may represent alkyl, cycloalkyl, alkoxy, aryl, aryloxy, or a heterocyclic group.

In general formulae (IIc) and (IId) R$^8$, R$^9$, R$^{10}$, R$^{15}$, R$^{16}$ and R$^{17}$ may also be substituted by one or more further, identical or different substituents selected from the group consisting of straight-chain or branched C$_1$-C$_5$-alkyl, in particular methyl, C$_1$-C$_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a more preferred embodiment the ligands L has the general formula (IId) wherein
R$^{15}$, R$^{16}$ and R$^{17}$ are identical or different, even more preferably identical, and can represent C$_1$-C$_{20}$ alkyl, C$_3$-C$_8$-cycloalkyl, C$_1$-C$_{20}$ alkoxy, C$_6$-C$_{20}$ aryl, C$_6$-C$_{20}$ aryloxy, C$_2$-C$_{20}$ heteroaryl or a C$_2$-C$_{20}$ heterocyclic group.

In an even more preferred embodiment the ligand L has the general formula (IId) wherein
R$^{15}$, R$^{16}$ and R$^{17}$ are identical and each selected from the group consisting of methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, neophenyl, cyclopropyl, cyclobutyl, cyclopentyl, cyclohexyl, cycloheptyl cyclooctyl, phenyl, biphenyl, naphthyl, phenanthrenyl, anthracenyl, tolyl, 2,6-dimethylphenyl, and trifluoromethyl.

In case one or both of the ligand L possess general formula (IId) it most preferably represents PPh$_3$, P(p-Tol)$_3$, P(o-Tol)$_3$, PPh(CH$_3$)$_2$, P(CF$_3$)$_3$, P(p-FC$_6$H$_4$)$_3$, P(p-CF$_3$C$_6$H$_4$)$_3$, P(C$_6$H$_4$—SO$_3$Na)$_3$, P(CH$_2$C$_6$H$_4$—SO$_3$Na)$_3$, P(isopropyl)$_3$, P(CHCH$_3$(CH$_2$CH$_3$))$_3$, P(cyclopentyl)$_3$, P(cyclohexyl)$_3$, P(neopentyl)$_3$ or P(neophenyl)$_3$.

Particular preference is given to catalyst systems comprising one of the two catalysts below, which fall under the general formula (A) and have the structures (IV) (Grubbs I catalyst) and (V) (Grubbs II catalyst), where Cy is cyclohexyl.

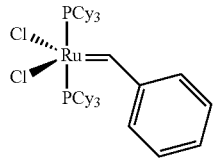
(IV)

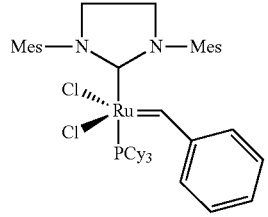
(V)

In a further embodiment, use can be made of a catalyst of the general formula (A1),

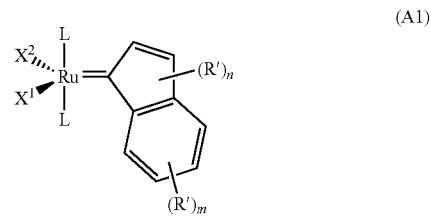
(A1)

where
X$^1$, X$^2$ and L can have the same general, preferred and particularly preferred meanings as in the general formula (A),
n is 0, 1 or 2,
m is 0, 1, 2, 3 or 4 and
R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals which may in each case be substituted by one or more alkyl, halogen, alkoxy, aryl or heteroaryl.

As preferred catalyst falling under the general formula (A1), it is possible to use, for example, the catalyst of the formula (VI) below, where Mes is in each case 2,4,6-trimethylphenyl and Ph is phenyl.

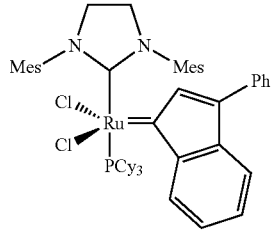
(VI)

This catalyst which is also referred to in the literature as "Nolan catalyst" is known, for example, from WO-A-2004/112951.

The catalysts of general formula (A) as well as the preferred and more preferred embodiments thereof can also be used in immobilized form to prepare the novel catalyst compositions. The immobilization favourably occurs via a chemical bond of the complex catalyst to the surface of a support material. Suited are e.g. complex catalysts having the general formulae (support-1), (support-2), or (support-3), as depicted below, wherein M, Y, L, $X^1$, $X^2$, and R may have all general, preferred, more preferred, particularly preferred and most preferred meanings listed above in this application for general formula (A) and wherein "supp" stands for the support material. Preferably the support material represents a macromolecular material, or silica gels. As macromolecular material synthetic polymers or resins may be used, with polyethylene glycol, polystyrenes or cross-linked polystyrenes (e.g. poly(styrene-divinylbenzene) copolymers (PS-DVB)) being even more preferred. Such support material comprises functional groups on its surface which are able to form covalent bonds to one of the ligands or substituents of the complex catalyst, like e.g. to the ligand L or $X^1$ or to the substituents $R^3$ or $R^4$ as shown in the below depicted formulae.

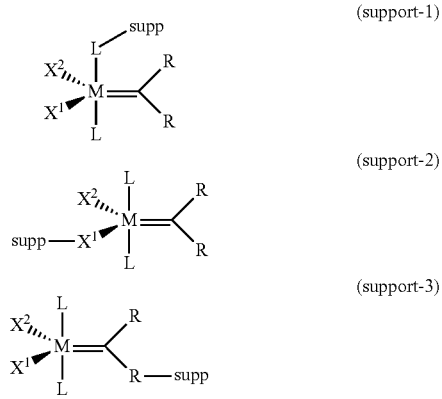

In such immobilized catalysts of general formulae formulae (support-1), (support-2), or (support-3) "supp" stands more preferably for a polymeric support, a resin, polyethyleneglycole, or silica gels having one or more functional groups "$X^3$" on their surface which are able to form a covalent bond to one of the ligands, like e.g. the L, R or $X^1$ as shown in the above formulae.

Suitable functional groups "$X^3$" on the surface are hydroxyl, amino, thiol, carboxyl, $C_1$-$C_{20}$ alkoxy, $C_1$-$C_{20}$ alkylthio, —Si(R)$_3$, —O—Si(R)$_3$, $C_6$-$C_{14}$ aryloxy, $C_2$-$C_{14}$ heterocyclic, sulfinyl, sulfonyl, —C(=O)R, —C(=O)OR, —C(=O)N(R)$_2$, —NR—C(=O)—N(R)$_2$, —SO$_2$N(R)$_2$, or —N(SO$_2$—R)$_2$ wherein in all above occurrences of R in $X^3$ is identical or different and shall mean H, $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties.

Polystyrene or cross-linked polystyrene is the preferred support material, even more preferably with hydroxyl groups on the surface to allow an easy coupling to the catalyst.

A further embodiment provides catalyst systems obtainable by using a catalyst of the general formula (B),

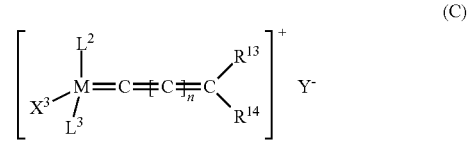

where
M is ruthenium or osmium,
$X^1$ and $X^2$ are identical or different and are anionic ligands,
R'' are identical or different and are organic moieties,
Im is a substituted or unsubstituted imidazoline or imidazolidine ligand and
An is an anion.

The catalysts of the general formula (B) are known in principle (see, for example, Angew. Chem. Int. Ed. 2004, 43, 6161-6165).

$X^1$ and $X^2$ in the general formula (B) can have the same general, preferred and particularly preferred meanings as in the formula (A).

The imidazoline or imidazolidine ligand usually has a structure of the general formulae (IIa) or (IIb) which have been mentioned above for the catalyst of general formula (A) and can have all the structures mentioned there as preferred, in particular those of the formulae (IIIa)-(IIIu).

In general formula (B) R'' are identical or different and are each a straight-chain or branched $C_1$-$C_{30}$-alkyl, $C_5$-$C_{30}$-cycloalkyl or aryl, where the $C_1$-$C_{30}$-alkyl moiety may be interrupted by one or more double or triple bonds or one or more heteroatoms, preferably oxygen or nitrogen.

Aryl is an aromatic radical having from 6 to 24 skeletal carbon atoms. As preferred monocyclic, bicyclic or tricyclic carbocyclic aromatic moieties having from 6 to 10 skeletal carbon atoms, mention may be made by way of example of phenyl, biphenyl, naphthyl, phenanthrenyl or anthracenyl.

Preference is given to R'' in the general formula (B) being identical and each being phenyl, cyclohexyl, cyclopentyl, isopropyl, o-tolyl, o-xylyl or mesityl.

A further alternative embodiment provides a catalyst system obtainable by using a catalyst of the general formula (C)

$$\left[ \begin{array}{c} L^2 \\ | \\ X^3 \end{array} M = C = C \stackrel{=}{=} C \stackrel{R^{13}}{\underset{R^{14}}{\diagdown}} \right]^+ Y^-$$

(C)

where
M is ruthenium or osmium,
$R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_1$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
$X^3$ is an anionic ligand,
$L^2$ is an uncharged π-bonded ligand which may either be monocyclic or polycyclic,
$L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines stibines, ethers, amines, amides, imines, sulphoxides, thioethers and pyridines, Y" is a noncoordinating anion and n is 0, 1, 2, 3, 4 or 5.

A further alternative embodiment provides a catalyst system obtainable by using a catalyst of the general formula (D),

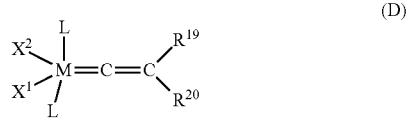

where

M is ruthenium or osmium, $X^1$ and $X^2$ are identical or different and are anionic ligands which can have all meanings of $X^1$ and $X^2$ mentioned in the general formulae (A) and (B), the symbols L represent identical or different ligands which can have all general and preferred meanings of L mentioned in the general formulae (A) and (B), $R^{19}$ and $R^{20}$ are identical or different and are each hydrogen or substituted or unsubstituted alkyl.

A further alternative embodiment provides a catalyst system according to the invention obtainable by using a catalyst of the general formula (E), (F) or (G),

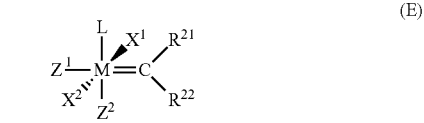

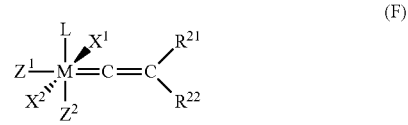

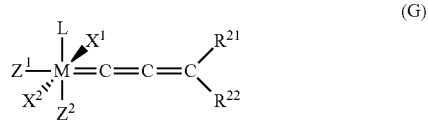

where

M is osmium or ruthenium, $X^1$ and $X^2$ are identical or different and are two ligands, preferably anionic ligands, L is a ligand, preferably an uncharged electron donor, $Z^1$ and $Z^2$ are identical or different and are uncharged electron donors, $R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl which are in each case substituted by one or more substituents selected from among alkyl, halogen, alkoxy, aryl or heteroaryl.

The catalysts of the general formulae (E), (F), and (G) are known in principle, e.g. from WO 2003/011455 A1, WO 2003/087167 A2, Organometallics 2001, 20, 5314 and Anew. Chem. Int. Ed. 2002, 41, 4038. The catalysts are commercially available or can be synthesized by the preparative methods indicated in the abovementioned literature references.

In the catalyst systems according to the invention, catalysts of the general formulae (E), (F), and (G) can be used in which $Z^1$ and $Z^2$ are identical or different and are uncharged electron donors. These ligands are usually weakly coordinating. The ligands are typically optionally substituted heterocyclic groups. These can be five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case optionally be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals which may in turn each be substituted by one or more moieties, preferably selected from the group consisting of halogen, in particular chlorine or bromine, $C_1$-$C_5$-alkyl, $C_1$-$C_5$-alkoxy and phenyl.

Examples of $Z^1$ and $Z^2$ encompass nitrogen-containing heterocycles such as pyridines, pyridazines, bipyridines, pyrimidines, pyrazines, pyrazolidines, pyrrolidines, piperazines, indazoles, quinolines, purines, acridines, bisimidazoles, picolylimines, imidazolines, imidazolidines and pyrroles.

$Z^1$ and $Z^2$ can also be bridged to one another to form a cyclic structure. In this case, $Z^1$ and $Z^2$ form a single bidentate ligand.

In the catalysts of the general formulae (E), (F), and (G) L can have the same general, preferred and particularly preferred meanings as L in the general formula (A) and (B).

In the catalysts of the general formulae (E), (F), and (G) $R^{21}$ and $R^{22}$ are identical or different and are each alkyl, preferably $C_1$-$C_{30}$-alkyl, particularly preferably $C_1$-$C_{20}$-alkyl, cycloalkyl, preferably $C_3$-$C_{20}$-cycloalkyl, particularly preferably $C_3$-$C_8$-cycloalkyl, alkenyl, preferably $C_2$-$C_{20}$-alkenyl, particularly preferably $C_2$-$C_{16}$-alkenyl, alkynyl, preferably $C_2$-$C_{20}$-alkynyl, particularly preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where the abovementioned substituents may be substituted by one or more alkyl, halogen, alkoxy, aryl or heteroaryl moieties.

In the catalysts of the general formulae (E), (F), and (G) $X^1$ and $X^2$ are identical or different and can have the same general, preferred and particularly preferred meanings as indicated above for $X^1$ and $X^2$ in the general formula (A).

Preference is given to using catalysts of the general formulae (E), (F), and (G) in which M is ruthenium, $X^1$ and $X^2$ are both halogen, in particular chlorine, $R^1$ and $R^2$ are identical or different and are five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case be substituted by one or more moieties selected from the group consisting of alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, $Z^1$ and $Z^2$ are identical or different and five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all these abovementioned groups may in each case optionally be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals which may in turn each be substituted by one or more moieties, preferably selected from the group consisting of halogen, in particular chlorine or bromine, $C_1$-$C_5$-alkyl, $C_1$-$C_5$-alkoxy and phenyl, $R^{21}$ and $R^{22}$ are identical or different and are each $C_1$-$C_{30}$-alkyl $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphinyl, and L has a structure of the above-described general formula (IIa) or (IIb), in particular one of the formulae (IIIa) to (IIIu).

A particularly preferred catalyst coming under general formula (E) has the structure (XIX),

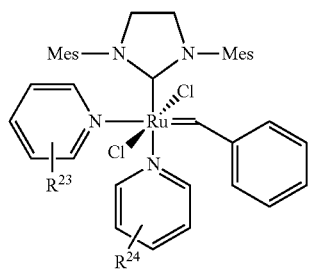

(XIX)

where $R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-alkoxy, $C_6$-$C_{24}$-aryl, preferably bromine, phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, dialkylamino, trialkylsilyl or trialkoxysilyl.

The abovementioned meanings for $R^{23}$ and $R^{24}$ $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, trialkylsilyl and trialkoxysilyl may in turn each be substituted by one or more halogen, preferably fluorine, chlorine or bromine, $C_1$-$C_5$-alkyl, $C_1$-$C_5$-alkoxy or phenyl moieties.

Particularly preferred embodiments of the catalyst of formula (XIX) have the structure (XIX a) or (XIX b), where $R^{23}$ and $R^{24}$ have the same meanings as indicated in formula (XIX).

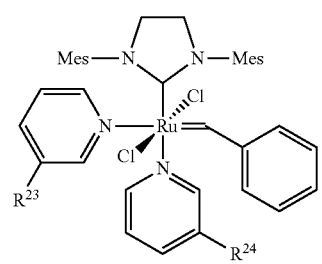

(XIXa)

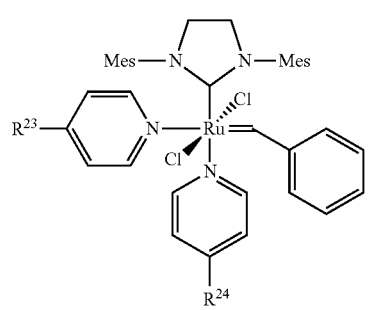

(XIXb)

When $R^{23}$ and $R^{24}$ are each bromine in formula (XIXa), the catalyst is referred to in the literature as the "Grubbs III catalyst".

Further suitable catalysts which come under general formulae (E), (F), and (G) have the structural formulae (XX)-(XXXII), where Mes is in each case 2,4,6-trimethylphenyl.

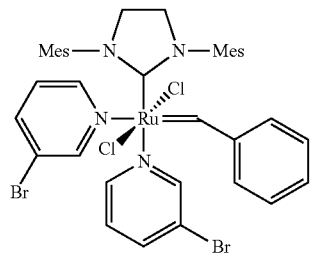

(XX)

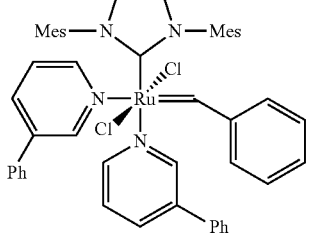

(XXI)

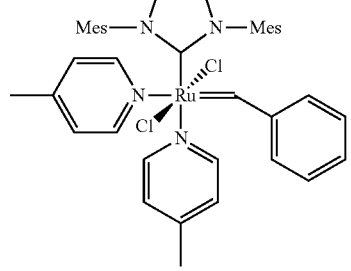

(XXII)

-continued
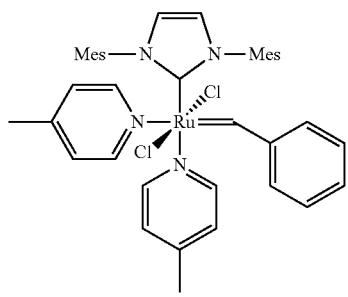
(XXIII)
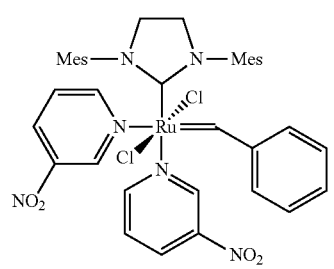
(XXIV)
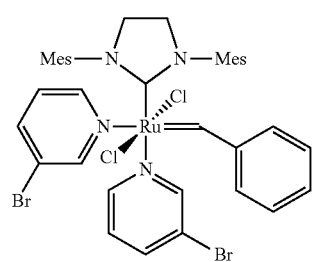
(XXV)
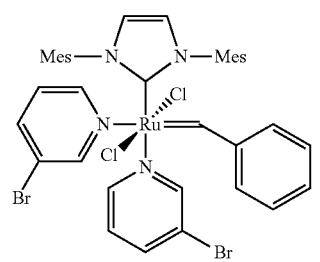
(XXVI)
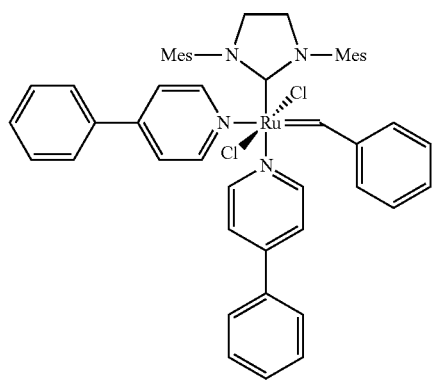
(XXVII)
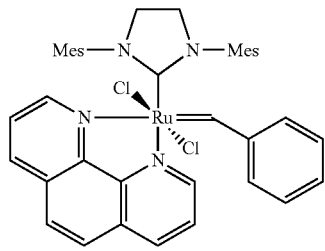
(XXVIII)
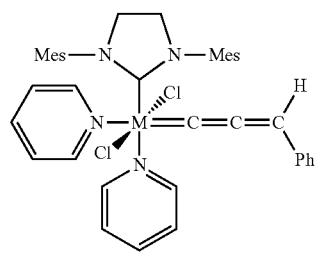
(XXIX)
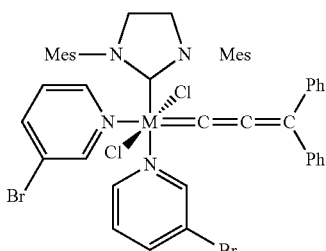
(XXX)
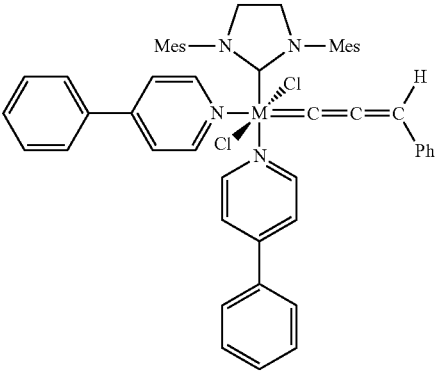
(XXXI)
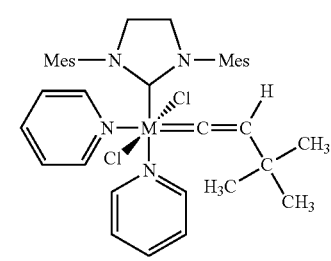
(XXXII)
A further embodiment relates to a catalyst system according to the invention obtainable by using a catalyst (N) which has the general structural element (N1), where the carbon atom denoted by "*" is bound via one or more double bonds to the catalyst framework with a ruthenium or osmium central metal,

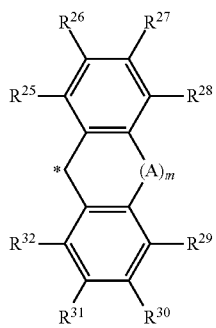

(N1)

and where
R$^{25}$-R$^{32}$ are identical or different and are each hydrogen, halogen, hydroxyl, aldehyde, keto, thiol, CF$_3$, nitro, nitroso, cyano, thiocyano, isocyanato, carbodiimide, carbamate, thiocarbamate, dithiocarbamate, amino, amido, imino, silyl, sulphonate (—SO$_3^-$), —OSO$_3^-$, —PO$_3^-$ or OPO$_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where all these moieties can each optionally be substituted by one or more alkyl, halogen, alkoxy, aryl or heteroaryl substituents, or, as an alternative, two directly adjacent substituents from the group consisting of R$^{25}$-R$^{32}$ together with the ring carbons to which they are bound form a cyclic group, preferably an aromatic system, by bridging or, as an alternative, R$^8$ is optionally bridged to another ligand of the ruthenium- or osmium-carbene complex catalyst, m is 0 or 1 and A is oxygen, sulphur, C(R$^{33}$R$^{34}$), N—R$^{35}$, —C(R$^{36}$)=C(R$^{37}$)—, —C(R$^{36}$)(R$^{38}$)—C(R$^{37}$)(R$^{39}$)—, where R$^{33}$-R$^{39}$ are identical or different and can each have the same meanings as R$^{25}$-R$^{32}$.

In the catalysts having the structural element of the general formula (N1) the carbon atom denoted by "*" is bound via one or more double bonds to the catalyst framework. If the carbon atom denoted by "*" is bound via two or more double bonds to the catalyst framework, these double bonds can be cumulated or conjugated.

Such catalysts (N) have been described in US-A-2009/0076226, which also discloses their preparation.

The catalysts (N) having a structural element of the general formula (N1) include, for example, catalysts of the general formulae (N2a) and (N2b) below,

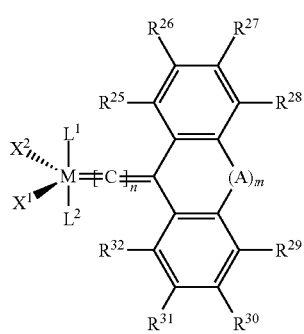

(N2a)

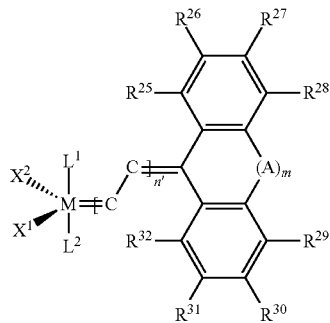

(N2b)

where
M is ruthenium or osmium,
X$^1$ and X$^2$ are identical or different and are two ligands, preferably anionic ligands,
L$^1$ and L$^2$ are identical or different ligands, preferably uncharged electron donors, where L$^2$ can alternatively also be bridged to the radical R$^8$,
n is 0, 1, 2 or 3, preferably 0, 1 or 2,
n' is 1 or 2, preferably 1, and
R$^{25}$-R$^{32}$, m and A have the same meanings as in the general formula (N1).

In the catalysts of the general formula (N2a), the structural element of the general formula (N1) is bound via a double bond (n=0) or via 2, 3 or 4 cumulated double bonds (in the case of n=1, 2 or 3) to the central metal of the complex catalyst. In the catalysts of the general formula (N2b) suitable to be used for the catalyst systems according to the invention, the structural element of the general formula (N1) is bound via conjugated double bonds to the metal of the complex catalyst. In both cases, the carbon atom denoted by "*" as a double bond in the direction of the central metal of the complex catalyst.

The catalysts of the general formulae (N2a) and (N2b) thus encompass catalysts in which the general structural elements (N3)-(N9)

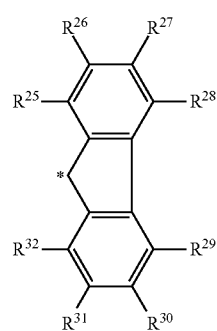

(N3)

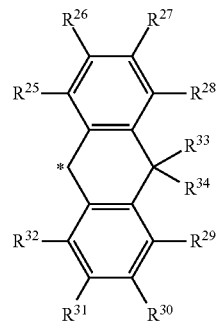

(N4)

-continued

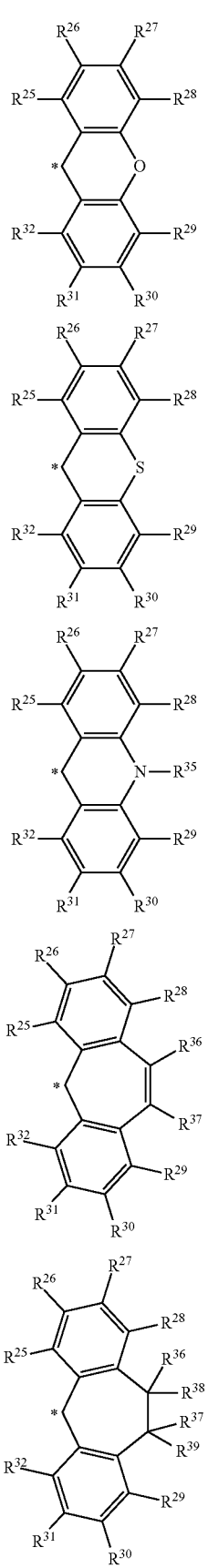

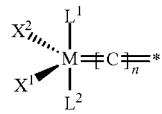

(N10a)

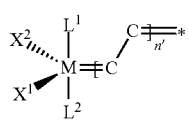

(N10b)

are bound via the carbon atom denoted by "*" via one or more double bonds to the catalyst framework of the general formula (N10a) or (N10b)

where $X^1$ and $X^2$, $L^1$ and $L^2$, n, n' and $R^{25}$-$R^{39}$ have the meanings given for the general formulae (N2a) and (N2b).

The Ru- or Os-based carbene catalysts resulting thereof typically have five-fold coordination.

In the structural element of the general formula (N1), $R^{25}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate ($—SO_3^-$), $—OSO_3^-$, $—PO_3^-$ or $OPO_3^-$ or alkyl, preferably $C_1$-$C_{20}$-alkyl, in particular $C_1$-$C_6$-alkyl, cycloalkyl preferably $C_3$-$C_{20}$-cycloalkyl, in particular $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, in particular phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, alkylsulphinyl, preferably $C_1$-$C_{20}$-alkylsulphinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, where these moieties can each be optionally substituted by one or more alkyl, halogen, alkoxy, aryl or heteroaryl substituents, or, as an alternative, in each case two directly adjacent substituents from the group consisting of $R^{25}$-$R^{32}$ together with the ring carbons to which they are bound may also form a cyclic group, preferably an aromatic system, by bridging or, as an alternative, $R^8$ is optionally bridged to another ligand of the ruthenium- or osmium-carbene complex catalyst, m is 0 or 1 and A is oxygen, sulphur, $C(R^{33})(R^{34})$, $N—R^{35}$, $—C(R^{36})=C(R^{37})—$ or $—C(R^{36})(R^{38})—C(R^{37})(R^{39})—$, where $R^{33}$-$R^{39}$ are identical or different and can each have the same preferred meanings as the radicals $R^1$-$R^8$.

$C_1$-$C_6$-Alkyl in the structural element of the general formula (N1) is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-Cycloalkyl in the structural element of the general formula (N1) is, for example, cyclopropyl, cyclobutyl, cylopentyl, cyclohexyl, cycloheptyl or cyclooctyl.

$C_6$-$C_{24}$-Aryl in the structural element of the general formula (N1) comprises an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

$X^1$ and $X^2$ in the structural element of the general formula (N1) have the same general, preferred and particularly preferred meanings indicated for catalysts of the general formula A.

In the general formulae (N2a) and (N2b) and analogously in the general formulae (N10a) and (N10b), $L^1$ and $L^2$ are identical or different ligands, preferably uncharged electron donors, and can have the same general, preferred and particularly preferred meanings indicated for catalysts of the general formula A.

Preference is given to catalysts of the general formulae (N2a) or (N2b) having a general structural unit (N1) in which M is ruthenium, $X^1$ and $X^2$ are both halogen, n is 0, 1 or 2 in the general formula (N2a) or n' is 1 in the general formula (N2b)

$L^1$ and $L^2$ are identical or different and have the general or preferred meanings indicated for the general formulae (N2a) and (N2b), $R^{25}$-$R^{32}$ are identical or different and have the general or preferred meanings indicated for the general formulae (N2a) and (N2b), m is either 0 or 1, and, when m=1, A is oxygen, sulphur, $C(C_1$-$C_{10}$-alkyl$)_2$, —$C(C_1$-$C_{10}$-alkyl$)_2$-$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

Very particular preference is given to catalysts of the general formulae (N2a) or (N2b) having a general structural unit (N1) in which M is ruthenium, $X^1$ and $X^2$ are both chlorine, n is 0, 1 or 2 in the general formula (N2a) or n' is 1 in the general formula (N2b)

$L^1$ is an imidazoline or imidazolidine ligand of one of the formulae (IIIa) to (IIIu), $L^2$ is a sulphonated phosphine, phosphate, phosphinite, phosphonite, arsine, stibine, ether, amine, amide, sulphoxide, carboxyl, nitrosyl, pyridine radical, an imidazolidine radical of one of the formulae (XIIa) to (XIIf) or a phosphine ligand, in particular $PPh_3$, $P(p$-$Tol)_3$, $P(o$-$Tol)_3$, $PPh(CH_3)_2$, $P(CF_3)_3$, $P(p$-$FC_6H_4)_3$, $P(p$-$CF_3C_6H_4)_3$, $P(C_6H_4$—$SO_3Na)_3$, $P(CH_2C_6H_4$—$SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$, $R^{25}$-$R^{32}$ have the general or preferred meanings indicated for the general formulae (N2a) and (N2b), m is either 0 or 1 and, when m=1,

A is oxygen, sulphur, $C(C_1$-$C_{10}$-alkyl$)_2$, —$C(C_1$-$C_{10}$-alkyl)=$C(C_1$-$C_{10}$-alkyl)- or —$N(C_1$-$C_{10}$-alkyl).

When $R^{25}$ is bridged to another ligand of the catalyst of the formula N, this results, for example for the catalysts of the general formulae (N2a) and (N2b), in the following structures of the general formulae (N13a) and (N13b)

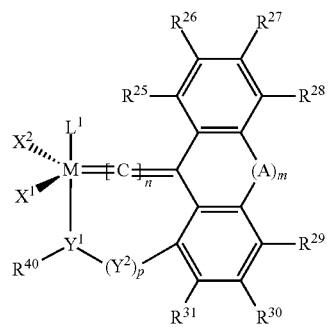

(N13a)

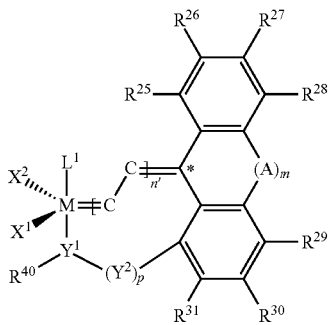

(N13b)

where $Y^1$ is oxygen, sulphur, N—$R^{41}$ or P—$R^{41}$, where $R^{41}$ has the meanings indicated below, $R^{40}$ and $R^{41}$ are identical or different and are each alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may each be optionally substituted by one or more alkyl, halogen, alkoxy, aryl or heteroaryl substituents, p is 0 or 1 and $Y^2$ when p=1 is —$(CH_2)_r$— where r=1, 2 or 3, —C(=O)—$CH_2$—, —C(=O)—, —N=CH—, —N(H)—C(=O)— or, as an alternative, the entire structural unit "—$Y^1$($R^{40}$)—$(Y^2)_p$—" is (—N($R^{40}$)=CH—$CH_2$—), (—N($R^{40}$, $R^{41}$)=CH—$CH_2$—), and where M, $X^1$, $X^2$, $L^1$, $R^{25}$-$R^{32}$, A, m and n have the same meanings as in general formulae (N2a) and (N2b).

As examples of catalysts of the formula (N), mention is made of the following structures:

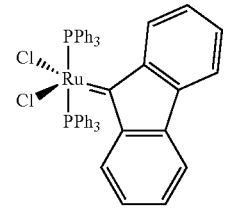 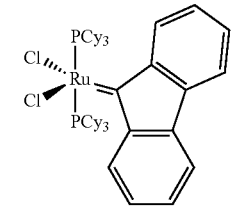

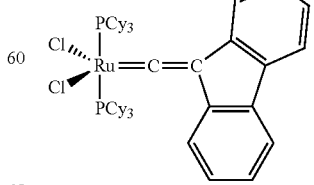 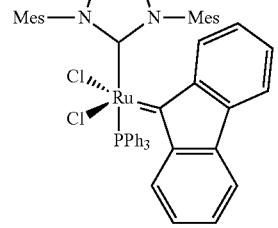

-continued
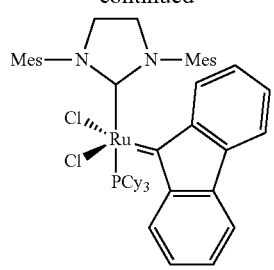
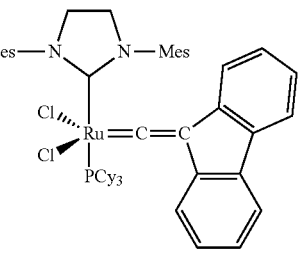
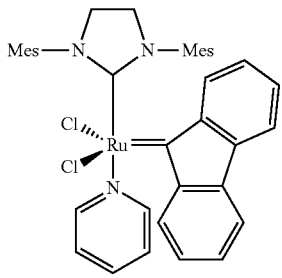
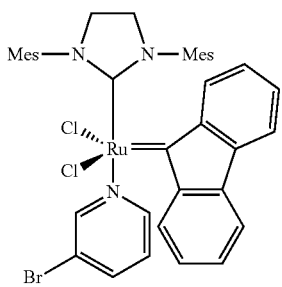
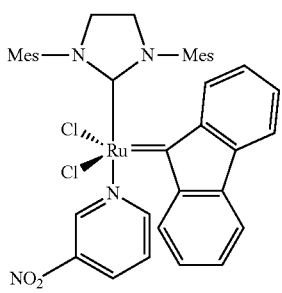
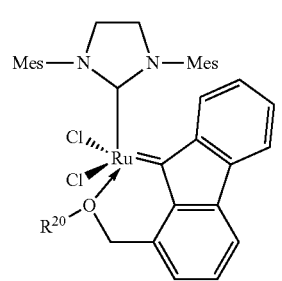
-continued
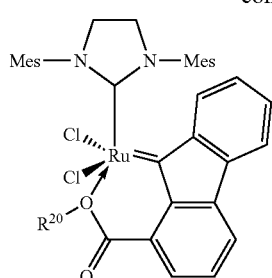 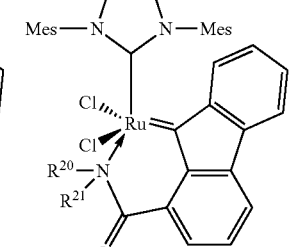
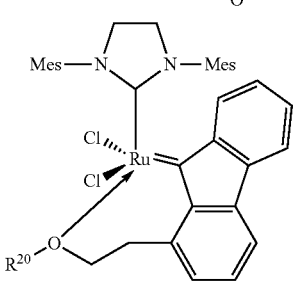
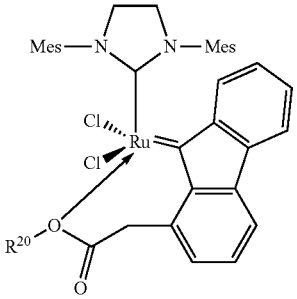
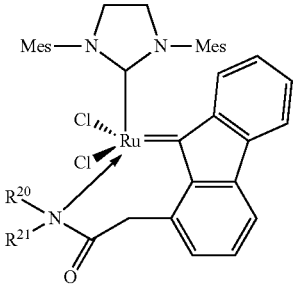
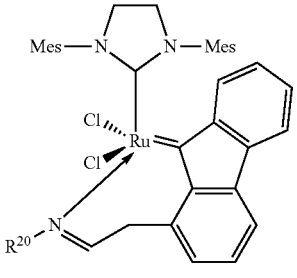
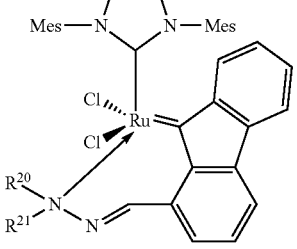

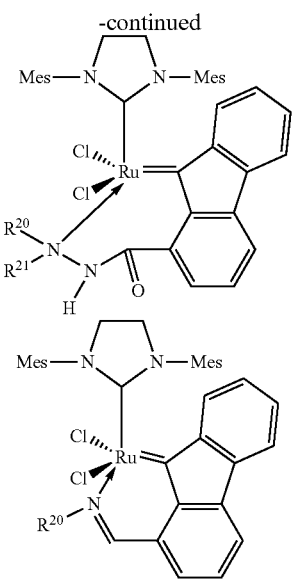

Step a) of the Process According to the Present Invention:

The preparation of the catalyst composition in step a) of the present process is performed at a temperature in the range of from 75° C. to 200° C., preferably in the range of from 80° C. to 200° C., and more preferably in the range of from 80° C. to 160° C. and with an appropriate hydrogen pressure ranging from 0.5 MPa to 35 MPa and preferably from 3 MPa to 11 MPa. The suitable time for the preparation of the catalyst composition ranges from 1 minute to 24 hours, preferably from 4 hours to 20 hours.

The preparation of the catalyst composition is typically carried out in a suitable solvent which does not deactivate the catalyst used and also does not have an adverse effect on the reaction in any other way. Preferably an organic solvent is used, more preferably dichloromethane, benzene, toluene, methyl ethyl ketone, acetone, tetrahydrofuran, tetrahydropyran, dioxane, cyclohexane or chlorobenzene. The particularly preferred solvents are chlorobenzene and methyl ethyl ketone.

The formation of the catalyst composition shall be performed in the absence of the nitrile rubber which only in the second step will be brought into contact with the catalyst composition and then hydrogenated.

The formation of the catalyst composition can be performed in any appropriate equipment suited for applying the respective hydrogen pressure. In particular autoclaves are used. After formation of the catalyst composition the reaction mixture containing the catalyst composition in the solvent is typically cooled to an ambient temperature, preferably to a temperature in the range of from 20° C. and 25° C. and the hydrogen released.

Step b) of the Process According to the Present Invention:

Thereafter the hydrogenation of the nitrile rubber is carried out by bringing the nitrile rubber into contact with hydrogen and the catalyst composition formed in step a). Typically the nitrile rubber is solved in a solvent, degassed and added to the autoclave containing the catalyst composition. Then hydrogen is added to the reaction system. In such step b) typically the same solvents are used as defined above for the performance of step a).

The hydrogenation is typically performed at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

Preferably, the hydrogenation time of the nitrile rubber is from 10 minutes to 24 hours, preferably from 15 minutes to 20 hours, more preferably from 30 minutes to 14 hours, even more preferably from 1 hour to 12 hours.

The amount of the catalyst composition which is present in the hydrogenation step b) based on the nitrile rubber can be chosen in a broad range, preferably so that from 1 to 1000 ppm of ruthenium or osmium, preferably from 2 to 500 ppm, in particular from 5 to 250 ppm, are present based on the nitrile rubber used.

One major advantage of the process according to the present invention resides in the high activity of the catalyst composition, so that the catalyst residue in the final HNBR products are low enough to make the catalyst metal removal or recycle step alleviated or even unnecessary. However, if desired, the catalyst used for hydrogenation may be removed, e.g. by using ion-exchange resins as described in EP-A-2 072 532 A1 and EP-A-2 072 533 A1. The reaction mixture obtained after the hydrogenation reaction can be taken and treated with such ion-exchange resin at e.g. 100° C. for 48 hours under nitrogen and can then be precipitated in cold methanol Nitrile Rubber:

The nitrile rubber used in the process of the present invention is a copolymer or terpolymer of at least one α,β-unsaturated nitrile, at least one conjugated diene and, if desired, one or more further copolymerizable monomers.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrite, it is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly preferred nitrile rubber used in the process of this invention is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably mono-unsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-decylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{15}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$—, more preferably $C_6$-$C_{12}$-cyclo-alkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably α-cyanoethyl acrylate, β-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxyalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacryiates may also be used like dimethylaminomethyl acrylate and diethylaminoethylacrylate.

Various other esters of the α,β-unsaturated carboxylic acids may also be used, like e.g. poly-ethyleneglycol(meth)acrylate, polypropyleneglycole(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furthon α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include maleic acid monoalkyl esters, preferably monomethyl maleate, monoethyl maleate, monopropyl maleate, and mono n-butyl maleate;

maleic acid monocycloalkyl esters, preferably monocyclopentyl maleate, monocyclohexyl maleate, and monocycloheptyl maleate;

maleic acid monoalkylcycloalkyl esters, preferably monomethylcyclopentyl maleate, and monoethylcyclohexyl maleate;

maleic acid monoaryl ester, preferably monophenyl maleate;

maleic acid mono benzyl ester, preferably monobenzyl maleate;

fumaric acid monoalkyl esters, preferably monomethyl fumarate, monoethyl fumarate, monopropyl fumarate, and mono n-butyl fumarate;

fumaric acid monocycloalkyl esters, preferably monocyclopentyl fumarate, monocyclohexyl fumarate, and monocycloheptyl fumarate;

fumaric acid monoalkylcycloalkyl esters, preferably monomethylcyclopentyl fumarate, and monoethylcyclohexyl fumarate;

fumaric acid monoaryl ester, preferably monophenyl fumarate;

fumaric acid mono benzyl ester, preferably monobenzyl fumarate;

citraconic acid monoalkyl esters, preferably monomethyl citraconate, monoethyl citraconate, monopropyl citraconate, and mono n-butyl citraconate;

citraconic acid monocycloalkyl esters, preferably monocyclopentyl citraconate, monocyclohexyl citraconate, and monocycloheptyl citraconate;

citraconic acid monoalkylcycloalkyl esters, preferably monomethylcyclopentyl citraconate, and monoethylcyclohexyl citraconate;

citraconic acid mono aryl ester, preferably monophenyl citraconate;

citraconic acid mono benzyl ester, preferably monobenzyl citraconate;

itaconic acid mono alkyl esters, preferably monomethyl itaconate, monoethyl itaconate, monopropyl itaconate, and mono n-butyl itaconate;

itaconic acid monocycloalkyl esters, preferably monocyclopentyl itaconate, monocyclohexyl itaconate, and monocycloheptyl itaconate;

itaconic acid monoalkylcycloalkyl esters, preferably monomethylcyclopentyl itaconate, and monoethylcyclohexyl itaconate;

itaconic acid mono aryl ester, preferably monophenyl itaconate;

itaconic acid mono benzyl ester, preferably monobenzyl itaconate.

As α,β-ethylenically unsaturated dicarboxylic acid diester monomers the analogous diesters based on the above explicitly mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Particularly preferred are termonomers chosen from the below depicted formulae:

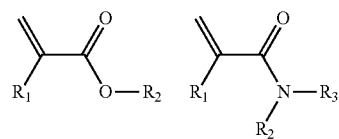

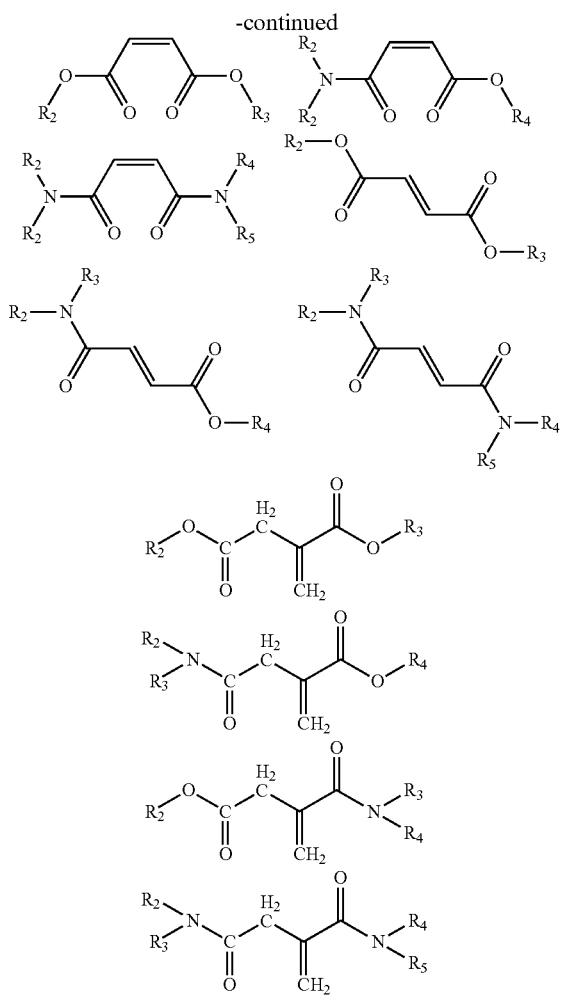

where
R$_1$ is hydrogen or methyl group, and
R$^2$, R$^3$, R$^4$, R$^5$ are identical or different and may represent H, C$_1$-C$_{12}$ alkyl, cycloalkyl, alkoxyalkyl, hydroxyalkyl, expoxyalkyl, aryl, heteroaryl.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of α,β-unsaturated nitrile or the sum of α,β-unsaturated nitrites is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitrites are replaced by proportions of the additional monomers, with the proportions of all monomers in each case adding up to 100% by weight.

The preparation of the nitrite rubbers by polymerization of the abovementioned monomers is adequately known to those skilled in the art and is comprehensively described in the literature. Nitrite rubbers which can be used for the purposes of the invention are also commercially available, e.g. as products sold as Perbunan® and Krynac® grades by Lanxess Deutschland GmbH.

The nitrile rubbers to be hydrogenated have a Mooney viscosity (ML1+4 at 100° C.), measured in accordance with ASTM standard D 1646, in the range from 1 to 75, and preferably from 5 to 50. The weight average molecular weight Mw is in the range 2,000-400,000 g/mol, preferably in the range 20,000-300,000. The nitrile rubbers have a polydispersity PDI=Mw/Mn, where Mw is the weight average molecular weight and Mn is the number average molecular weight, in the range 1-5. The determination of the Mooney viscosity is carried out in accordance with ASTM Standard ID 1646.

As the metathesis activity of the ruthenium- or osmium-based catalyst used to prepare the catalyst composition according to this invention is not existing in the catalyst composition of the present invention the molecular weight of the hydrogenated nitrile rubber obtained after the hydrogenation is comparable to the original NBR feedstock and not further reduced during hydrogenation.

Hence, a hydrogenated nitrile rubber with a weight average molecular weight Mw in the range 2,000-400,000 g/mol, preferably in the range 20,000-300,000 is obtained. The Mooney viscosity (ML1+4 at 100° C.), measured in accordance with ASTM standard D 1646, of the hydrogenated nitrile rubbers is in the range from 1 to 150, preferably from 10 to 100. The polydispersity PDI=Mw/Mn, where Mw is the weight average molecular weight and Mn is the number average molecular weight, in the range 1-5 and preferably in the range 1.5-4.

For the purposes of the present invention, hydrogenation is a reaction of the double bonds present in the starting nitrile rubber to an extent of at least 50%, preferably 70-100%, more preferably 80-100%; even more preferably 90-100%

The invention is further illustrated but is not intended to be limited by the following examples in which all parts and percentages are by weight unless otherwise specified.

EXAMPLES

Catalysts Used in the Examples

Catalysts (1) and (2) were purchased from Sigma Aldrich or Strem Chemicals Inc. Catalyst (3) was purchased from Xian Kaili Co. (China). The structures of these catalysts are shown below, wherein "Mes" means mesityl (2,4,6-trimethylphenyl) and "Cy" means cyclohexyl:

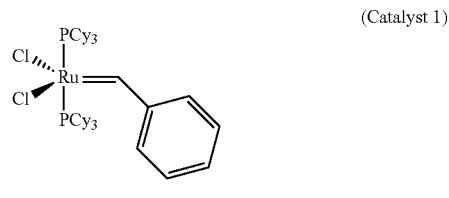

(Catalyst 1)

(Grubbs 1)

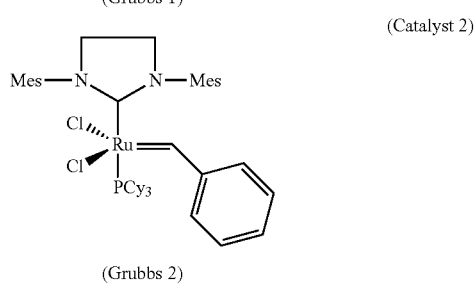

(Catalyst 2)

(Grubbs 2)

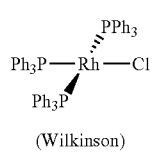
(Catalyst 3)

(Wilkinson)

These catalysts have the following molecular weights:

| catalyst | molecular weight [g/mol] |
|---|---|
| (1) | 822.96 |
| (2) | 848.97 |
| (3) | 925.22 |

Nitrile Butadiene Rubber:

The nitrile butadiene rubber used in the examples had the properties outlined in Table 1.

TABLE 1

| Nitrite Butadiene Rubber (NBR) used ("ACN" means acrylonitrile) | | | | | |
|---|---|---|---|---|---|
| NBR | ACN content % by weight | Mooney viscosity ML(1 + 4) 100° C. | Mn | Mw | PDI |
| Perbunan ® 3431 VP | 34 | 29 | 77,101 | 255,395 | 3.31 |

Analytical Tests:

GPC Test:

The apparent molecular weight Mn and Mw were determined by a Waters GPC system equipped with a Waters 1515 high performance liquid chromatography pump, a Waters 717plus autosampler, a PL gel 10 μm mixed B column and a Waters 2414 RI detector. The GPC test was carried out at 40° C. at 1 mL/min of flow rate with THF as the eluent, and the GPC column was calibrated with narrow PS standard samples.

FT-JR Test:

The spectrum of nitrile rubber before, during and after the hydrogenation reaction was recorded on a Perkin Elmer spectrum 100 FT-IR spectrometer. The solution of the nitrile butadiene rubber in MCB was cast onto a KBr disk and dried to form a film for the test. The hydrogenation conversion is determined by the FT-IR analysis according to the ASTM D 5670-95 method.

ABBREVIATIONS phr: per hundred rubber (weight)
rpm: revolution per minute
Mn: number-average molecular weight
Mw: weight-average molecular weight
PDI: polydispersity index, defined as Mw/Mn
triphenylphosphine
MCB: monochlorobenzene
RT: room temperature (22++/−2° C.)

Example 1

Comparison Example, Using Catalyst (3)

A solution of 18 g Perbunan® 3431 VP in 282 g MCB was bubbled with nitrogen in a 600 mL Parr autoclave for 30 minutes, and then heated to 120° C. Wilkinson's catalyst (15 mg) and PPh$_3$ (18 mg) was dissolved in another 22 g of degassed MCB and then added into the reactor. Hydrogenation was conducted under 4.137 MPa of hydrogen pressure and 800 rpm of agitation speed. Samples were taken from the reactor at intervals for FT-IR analysis to determine the hydrogenation degree. After 5 hours of hydrogenation, the hydrogenation degree reached 90.3%, the reactor was cooled to room temperature and the pressure was released. The final molecular weights and PDI were: Mn=76,286, Mw=260,572, PDI=3.42.

Examples 2

Inventive Example; Perbunan® 3431 VP; Catalyst (2)

Catalyst (2) (36 mg) was dissolved in 176 g degassed MCB in an autoclave, hydrogen was added at a pressure of 4.137 MPa. and the solution was stirred at 120° C. for 12 hours. Then the autoclave containing the catalyst composition was cooled to room temperature and the hydrogen pressure was released. A solution of 36 g Perbunan® 3431VP in 564 g MCB was bubbled with nitrogen in a glass flask for 30 minutes, then pressed into the autoclave containing the catalyst composition. The autoclave was then heated to 120° C. Hydrogenation was then conducted under 4.137 MPa of hydrogen pressure and 800 rpm of agitation speed. Samples were taken from the reactor at intervals for FT-IR analysis to determine the hydrogenation degree. After 12 hours of hydrogenation, the hydrogenation degree reached 75.5%. The final molecular weights and the PDI were: Mn=83,557, Mw=284,837, PDI=3.41.

Example 3

Inventive Example; Perbunan® 3431VP; Catalyst (2)

All the conditions and operation were the same as in Example 2 except that the temperature during the preparation of the catalyst composition by contacting Catalyst (2) with hydrogen as well as during subsequent hydrogenation was 100° C. instead of 120° C. After 12 hours of hydrogenation, the hydrogenation degree reached 85%. The final molecular weights and the PDI were: Mn=81,045, Mw=257, 028, PDI=3.17

Example 4

Inventive Example; Perbunan® 3431VP; Catalyst (1)

All the conditions and operation were the same as in Example 2 except that Catalyst (1) was used and that the temperature during the preparation of the catalyst composition by contacting Catalyst (1) with hydrogen as well as during subsequent hydrogenation was 100° C. instead of 120° C. After 12 hours of hydrogenation, the hydrogenation degree reached 81.6%. The final molecular weights and the PDT were: Mn=77,588, Mw=247,515, PDI=3.19.

The results of Examples 1 to 4 are summarized in Table 2. Only for comparison reasons the number and weight average molecular weights as well as PDI has been included at the bottom of Table 2 with regard to the starting nitrile rubber then subjected to hydrogenation in Examples 1 to 4.

TABLE 2

Results for Examples 1 to 4 (average molecular weights Mn and Mw and PDI for HNBR obtained)
(Comparison Example is marked with an asterisk "*")

| Example | HNBR Mn | HNBR Mw | HNBR PDI | Hydrogenation degree | Summary of reaction conditions (Catalyst, process conditions for preparation of catalyst composition) |
|---|---|---|---|---|---|
| 1* | 76,286 | 260,572 | 3.42 | 90.3% | Wilkinson catalyst, no treatment with $H_2$ |
| 2 | 83,557 | 284,837 | 3.41 | 75.5% | Grubbs $2^{nd}$; treatment with $H_2$ at 120° C. for 12 hours |
| 3 | 81,045 | 257,028 | 3.17 | 85.0% | Grubbs $2^{nd}$, treatment with $H_2$ at 100° C. for 12 hours |
| 4 | 77,588 | 247,515 | 3.19 | 81.6% | Grubbs 1st, treatment with $H_2$ at 100° C. for 12 hours |
| Perbunan® 3431 VP | 77,101 | 255,395 | 3.31 | | |

What is claimed is:

1. A process of hydrogenating a nitrile rubber, the process comprising:
   a) contacting a complex catalyst comprising:
      ruthenium or osmium; and
      at least one ligand bound to the ruthenium or osmium in a carbene-like fashion,
      with hydrogen in the absence of a nitrile rubber at a temperature of 75° C. to 200° C. to form a catalyst composition; and thereafter
   b) hydrogenating nitrile rubber in the presence of the catalyst composition formed in step a).

2. The process according to claim 1, wherein the catalyst is a catalyst selected from the group consisting of:
   (i) catalysts of general formula (A),

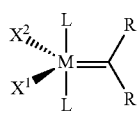

(A)

where
   M is osmium or ruthenium,
   $X^1$ and $X^2$ are identical or different,
   L are identical or different ligands,
   R are identical or different and are each hydrogen, alkylcycloalkyl, alkenyl, alkynyl, aryl, carboxylate, alkoxy, alkenyloxyalkynyloxy, aryloxy, alkoxycarbonyl, alkylamino, alkylthio, arylthio, alkylsulphonyl, or alkylsulphinyl, where these groups may in each case optionally be substituted by one or more alkyl, halogen, alkoxy, aryl or heteroaryl moieties or, as an alternative, the two groups R together with the common carbon atom to which they are bound are bridged to form a cyclic structure which can be aliphatic or aromatic in nature, may be substituted and may contain one or more heteroatoms, (ii) catalysts of general formula (A1),

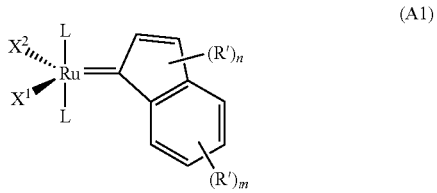

(A1)

where
   $X^1$, $X^2$ and L are as set forth in the general formula (A),
   N is 0, 1 or 2,
   m is 0, 1, 2, 3 or 4, and
   R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkysulphinyl radicals which may in each case be substituted by one or more alkyl, halogen, alkoxy, aryl or heteroaryl, (iii) catalysts of general formula (B),

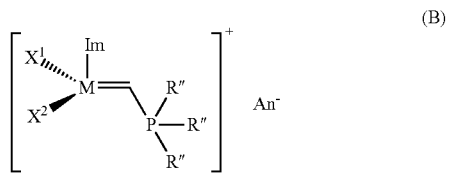

(B)

where
   M is ruthenium or osmium,
   $X^1$ and $X^2$ are identical or different and are anionic ligands,
   R" are identical or different and are organic moieties,
   Im is a substituted or unsubstituted imidazoline or imidazolidine ligand, and
   An is an anion, (iv) catalysts of general formula (C)

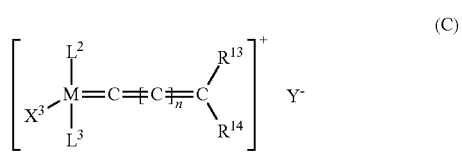

(C)

where
   M is ruthenium or osmium,
   $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
   $X^3$ is an anionic ligand,
   $L^2$ is an uncharged π-bonded ligand which may either be monocyclic or polycyclic,
   $L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines stibines, ethers, amines, amides, imines, sulphoxides, thioethers and pyridines, Y⁻ is a noncoordinating anion, and
n is 0, 1, 2, 3, 4 or 5,
(v) catalysts of general formula (D),

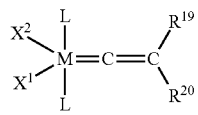

where
M is ruthenium or osmium,
X¹ and X² are identical or different anionic ligands as set forth in the general formulae (A) and (B),
L represents identical or different ligands as set forth in the general formulae (A) and (B),
$R^{19}$ and $R^{20}$ are identical or different and are each hydrogen or substituted or unsubstituted alkyl,
(vi) catalysts of general formula (E), (F) or (G),

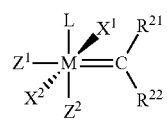

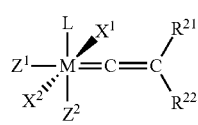

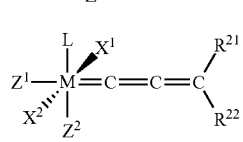

where
M is osmium or ruthenium,
X¹ and X² are identical or different two ligands,
L is a ligand,
Z¹ and Z² are identical or different and are uncharged electron donors,
$R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl which are in each case substituted by one or more substituents selected from among alkyl, halogen, alkoxy, aryl or heteroaryl,
(vii) catalysts (N) comprising a general structural element (N1) where the carbon atom denoted by "*" is bound via one or more double bonds to the catalyst having a ruthenium or osmium central metal,

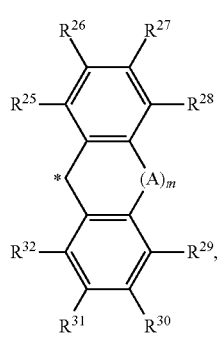

where
$R^{25}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate (—$SO_3^-$), —$OSO_3^-$, —$PO_3^-$ or $OPO_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylamino, alkylsilyl or alkoxysilyl, where all these moieties can each optionally be substituted by one or more alkyl, halogen, alkoxy, aryl or heteroaryl substituents, or, as an alternative, two directly adjacent substituents from the group consisting of $R^{25}$-$R^{32}$ together with the ring carbons to which they are bound form a cyclic group, by bridging or, as an alternative, $R^8$ is optionally bridged to another ligand of the ruthenium- or osmium-carbene complex catalyst,
m is 0 or 1, and
A is oxygen, sulphur, $C(R^{33}R^{34})$, N—$R^{35}$, —$C(R^{36})$=$C(R^{37})$—, —$C(R^{36})(R^{38})$—$C(R^{37})(R^{39})$—, where $R^{33}$-$R^{39}$ are identical or different and can each have the same meanings as $R^{25}$-$R^{32}$, and
(viii) catalysts of general formulae (N2a) or (N2b),

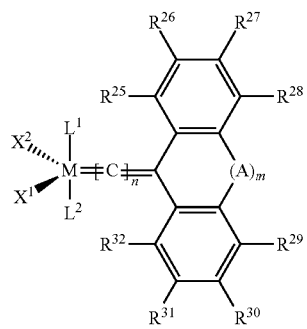

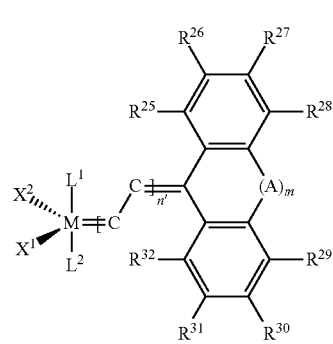

where
M is ruthenium or osmium,
X¹ and X² are identical or different ligands,
L¹ and L² are identical or different ligands, where L² can alternatively also be bridged to the radical $R^8$,
N is 0, 1, 2 or 3,
n' is 1 or 2, and
$R^{25}$-$R^{32}$, m and A have the same meanings as given in general formula (N1).
3. The process according to claim 2, wherein in step a) the catalyst is of general formula (A) in which one group R is hydrogen and the other group R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_8$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these moieties may in each case be substituted by one or more alkyl, halogen, alkoxy, aryl or heteroaryl groups.

4. The process according to claim 2, wherein in step a) the catalyst is of general formula (A) in which $X^1$ and $X^2$ are identical and are each halogen, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate ($CH_3$—$SO_3$) or $CF_3SO_3$ (trifluoromethanesulphonate).

5. The process according to claim 2, wherein in step a) the catalyst is of general formula (A) in which one or both of the ligands L have a structure according to general formulae (IIa)-(IId), wherein the ligands L can be identical or different,

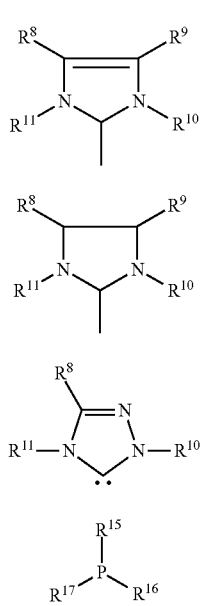

where
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R), —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano, wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl, and $R^{15}$, $R^{16}$ and $R^{17}$ are identical or different and may represent alkyl, cycloalkyl, alkoxy, aryl, aryloxy, or a heterocyclic group.

6. The process according to claim 2, wherein in step a) the catalyst is of general formula (A) in which one or both of the ligands L have a structure according to formulae (IIIa) to (IIIu), where in all cases "Ph" means phenyl, "Bu" butyl, "Mes" 2,4,6-trimethylphenyl, "Dipp" 2,6-diisopropylphenyl, and "Dimp" 2,6-dimethylphenyl, and wherein the ligands L can be identical or different,

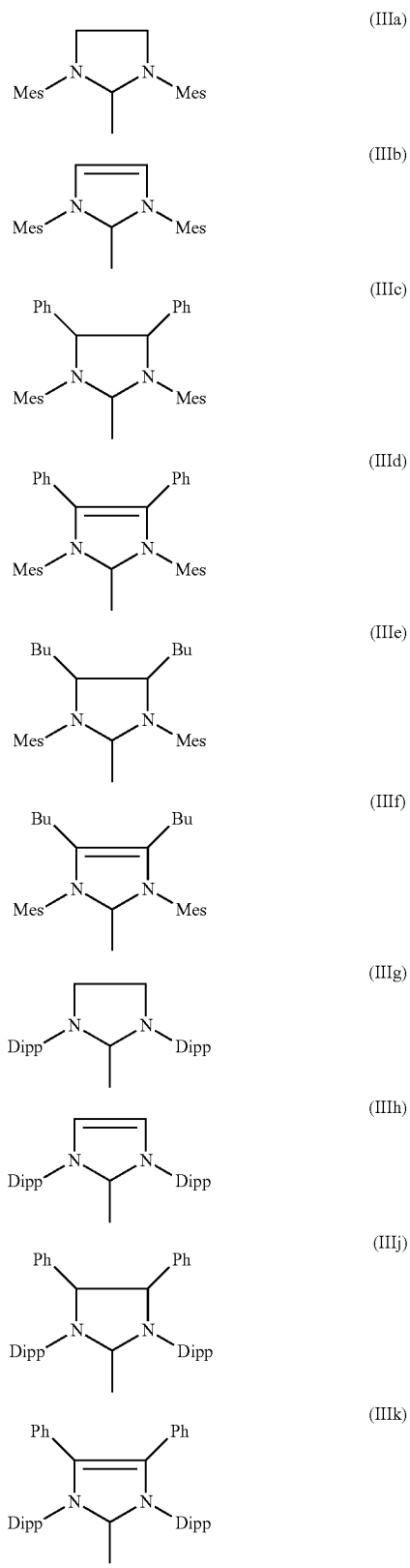

-continued

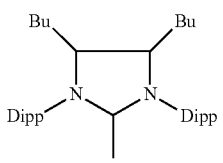 (IIIm)

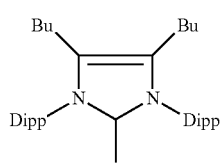 (IIIn)

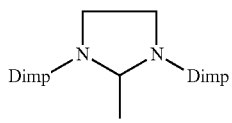 (IIIp)

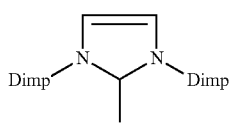 (IIIq)

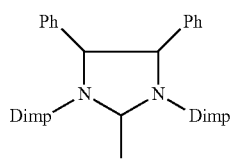 (IIIr)

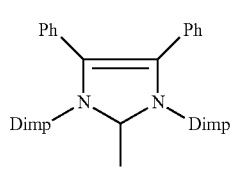 (IIIs)

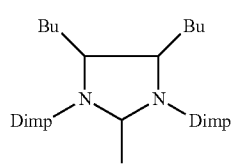 (IIIt)

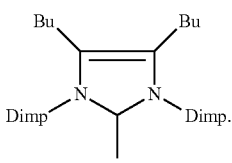 (IIIu)

7. The process according to claim 2, wherein in step a) the catalyst of general formula (A) is immobilized on a support material and has the general formulae (support-1), (support-2), or (support-3),

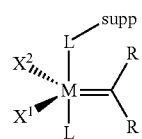 (support-1)

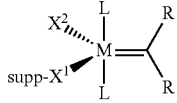 (support-2)

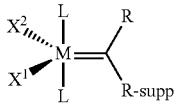 (support-3)

wherein M, Y, L, $X^1$, $X^2$, and R may have the meanings given for general formula (A) and wherein "supp" stands for the support material.

8. The process according to claim 2, wherein in step a) the catalyst is of the general formulae (E), (F), or (G) in which
M is ruthenium,
$X^1$ and $X^2$ are both halogen,
$R^1$ and $R^2$ are identical or different and are five- or six-membered monocyclic groups having from 1 to 4, heteroatoms or bicyclic or polycyclic structures made up of 2, 3, 4 or 5 five- or six-membered monocyclic groups of this type, where all the above-mentioned groups may in each case be substituted by one or more moieties selected from the group consisting of alkyl, cycloalkyl, alkoxy, halogen, aryl, or heteroaryl,
$Z^1$ and $Z^2$ are identical or different and five or six-membered monocyclic groups having from 1 to 4, heteroatoms or bicyclic or polycyclic structures made up of 2, 3, 4 or 5 five- or six-membered monocyclic groups of this type, where all these above-mentioned groups may in each case optionally be substituted by one or more alkyl, cycloalkyl, alkoxy, halogen, aryl, or heteroaryl, radicals which may in turn each be substituted by one or more moieties selected from the group consisting of halogen, $C_1$-$C_5$-alkyl, $C_1$-$C_5$-alkoxy and phenyl,
$R^{21}$ and $R^{22}$ are identical or different and are each $C_1$-$C_{30}$-alkyl $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_3$-alkylthio, $C_6$-$C_{24}$-arylthio, $C_1$-$C_{20}$-alkylsulphonyl, $C_1$-$C_{20}$-alkylsulphinyl, and
L has a structure of the above-described general formula (IIa) or (IIb).

9. The process according to claim 2, wherein in step a) the catalyst is of the general formula (E) having the structure (XIX),

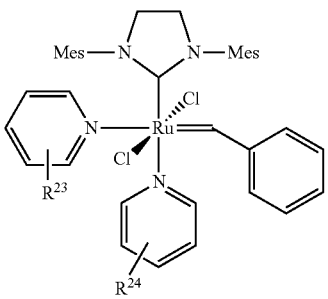 (XIX)

where
$R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, formyl, nitro, a nitrogen heterocycle, carboxy, alkylcarbonyl, halocarbonyl, carbamoyl, thiocarbamoyl, carbamido, thioformyl, amino, dialkylamino, trialkylsilyl or trialkoxysilyl.
10. The process according to claim 1, wherein in step a) the catalyst is selected from the catalysts shown in the following formulae, wherein "Cy" is cyclohexyl, "Mes" is in each case 2,4,6-trimethylphenyl and "Ph" represents phenyl,
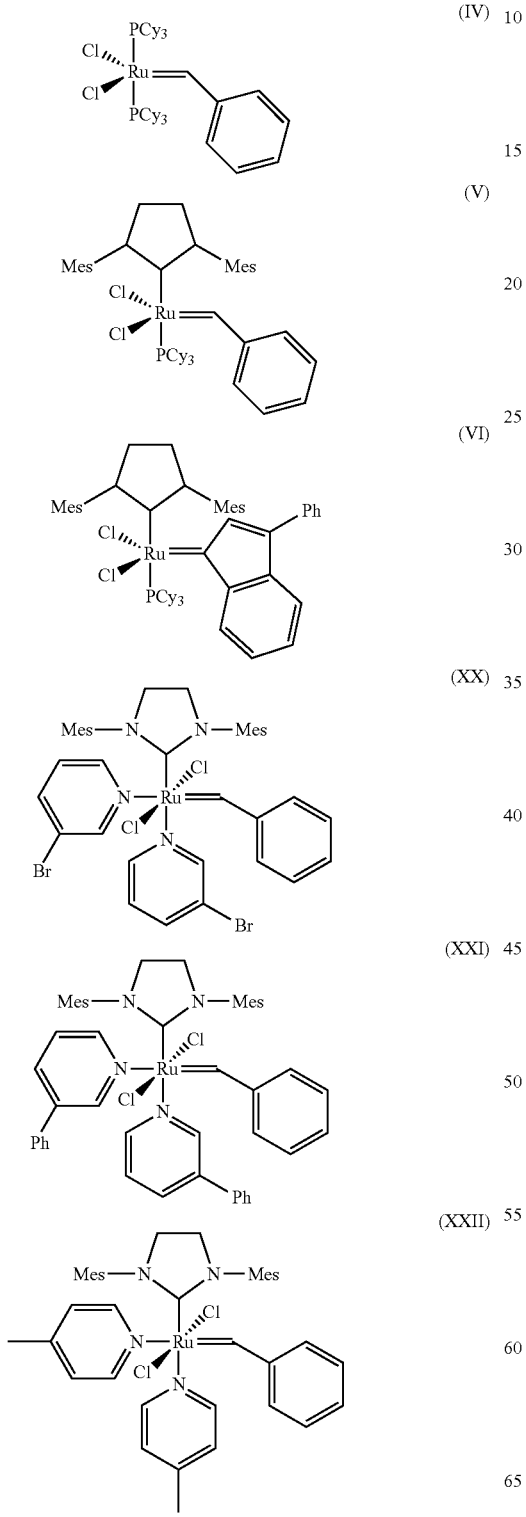

-continued
(XXVIII)
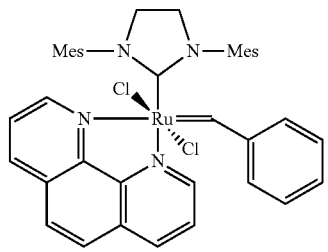
(XXIX)
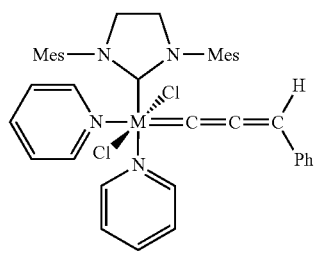
(XXX)
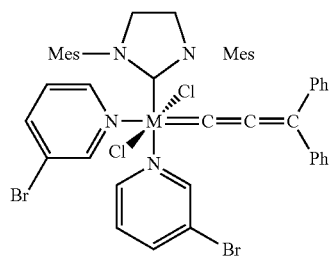
(XXXI)
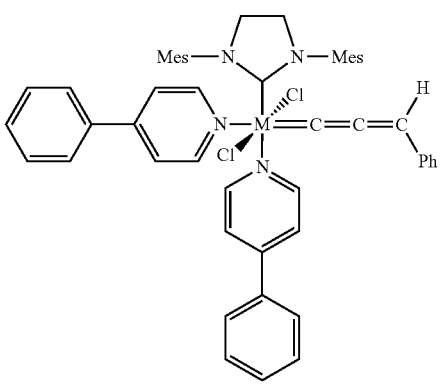
(XXXII)
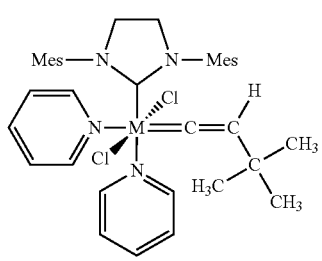
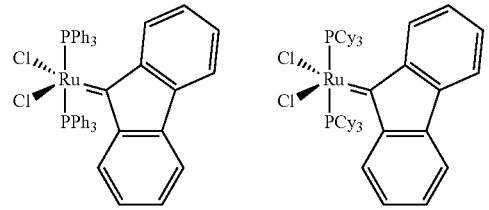
-continued
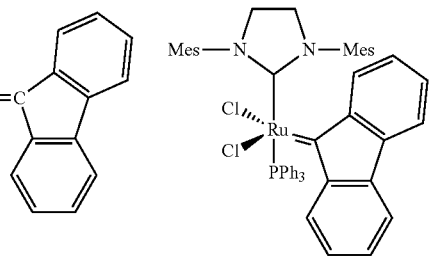
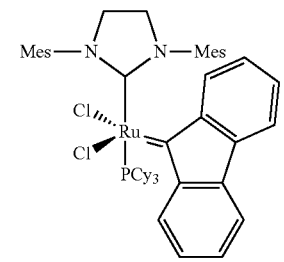
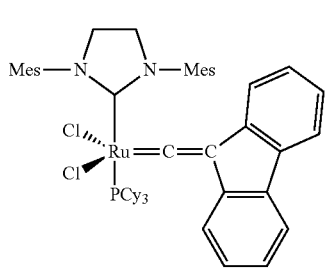
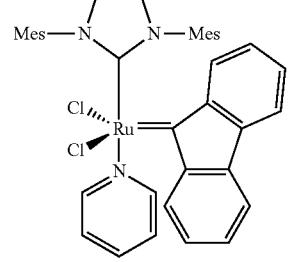
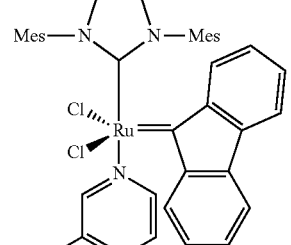
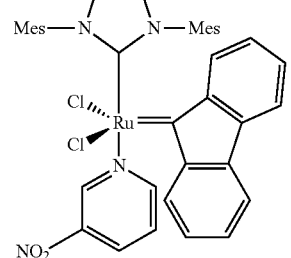

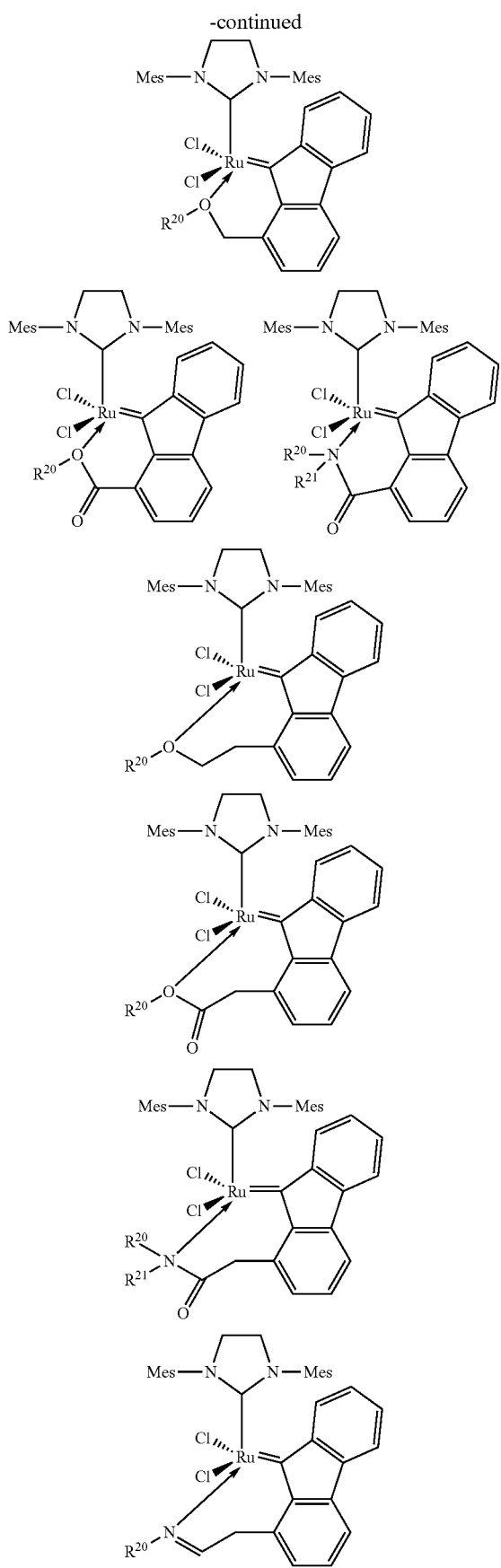

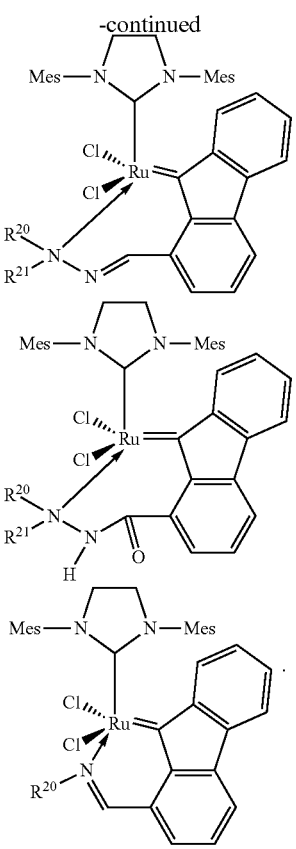

11. The process according to claim 1, wherein the catalyst has the structure

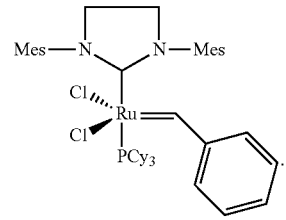

12. The process according to claim 1, wherein the temperature in step a) is 80° C. to 200° C., and at a hydrogen pressure of 0.5 MPa to 35 MPa.

13. The process according to claim 1, wherein the hydrogenation in step b) is performed at a temperature 60° C. to 200° C., and at a hydrogen pressure of 0.5 MPa to 35 MPa.

14. The process according to claim 1, wherein the nitrile rubber is a copolymer of at least one α,β-unsaturated nitrile and at least one conjugated diene.

15. The process according to claim 1, wherein the nitrile rubber is a terpolymer of at least one α,β-unsaturated nitrile, at least one conjugated diene, and one or more further copolymerisable monomers selected from the group consisting of α,β-unsaturated monocarboxylic adds, their esters, their amides, α,β-unsaturated dicarboxylic acids, their mono- or diesters, their anhydrides and their amides.

16. The process according to claim 1, wherein the process is performed in an organic solvent.

17. The process according to claim 16, wherein the organic solvent is selected from the group consisting of dichloromethane, benzene, toluene, methyl ethyl ketone, acetone, tetrahydrofuran, tetrahydropyran, dioxane, cyclohexane, and chlorobenzene.

* * * * *